US008812537B1

(12) United States Patent
Kapoor

(10) Patent No.: US 8,812,537 B1
(45) Date of Patent: Aug. 19, 2014

(54) APPARATUSES, METHODS AND SYSTEMS FOR A DESCRIPTIVE BUSINESS GRAMMAR SYNTAX QUERIER

(76) Inventor: Vikas Kapoor, New York, NY (US)

(*) Notice: Subject to any disclaimer, the term of this patent is extended or adjusted under 35 U.S.C. 154(b) by 323 days.

(21) Appl. No.: 12/763,320

(22) Filed: Apr. 20, 2010

Related U.S. Application Data

(63) Continuation of application No. 12/650,542, filed on Dec. 31, 2009, now abandoned.

(60) Provisional application No. 61/252,611, filed on Oct. 16, 2009.

(51) Int. Cl.
*G06F 17/30* (2006.01)

(52) U.S. Cl.
USPC .......................................................... 707/769

(58) Field of Classification Search
None
See application file for complete search history.

(56) References Cited

U.S. PATENT DOCUMENTS

| 6,460,043 | B1* | 10/2002 | Tabbara et al. ......................... 1/1 |
| 6,523,172 | B1* | 2/2003 | Martinez-Guerra et al. . 717/143 |
| 7,143,107 | B1* | 11/2006 | Nebres, Jr. ..................... 707/603 |
| 7,505,985 | B2* | 3/2009 | Kilroy .................................. 1/1 |
| 2005/0234878 | A1* | 10/2005 | Dettinger et al. ................. 707/3 |
| 2008/0281580 | A1* | 11/2008 | Zabokritski ....................... 704/9 |

* cited by examiner

*Primary Examiner* — Rehana Perveen
*Assistant Examiner* — Hung Havan
(74) *Attorney, Agent, or Firm* — Chadbourne & Parke LLP

(57) ABSTRACT

The APPARATUSES, METHODS AND SYSTEMS FOR A DESCRIPTIVE BUSINESS GRAMMAR SYNTAX QUERIER ("QUERIER") implement efficient and scalable monitoring, regulation, and allocation of computational processing, data, labor, and/or the like resources within an enterprise. The Querier may include facilities for basal tagging to associate entities, employees, transactions, projects and/or assignments, and/or the like business data with various tables in an enterprise database, and the implementation of a descriptive business grammar to access, search, store, manipulate, modify and/or the like stored business data. The Querier allows for engagement of descriptive business grammar phraseology for accessing, querying, viewing and/or creating associations for data in a database, tailoring rules, managing and/or allocating enterprise resources, and/or the like.

32 Claims, 19 Drawing Sheets

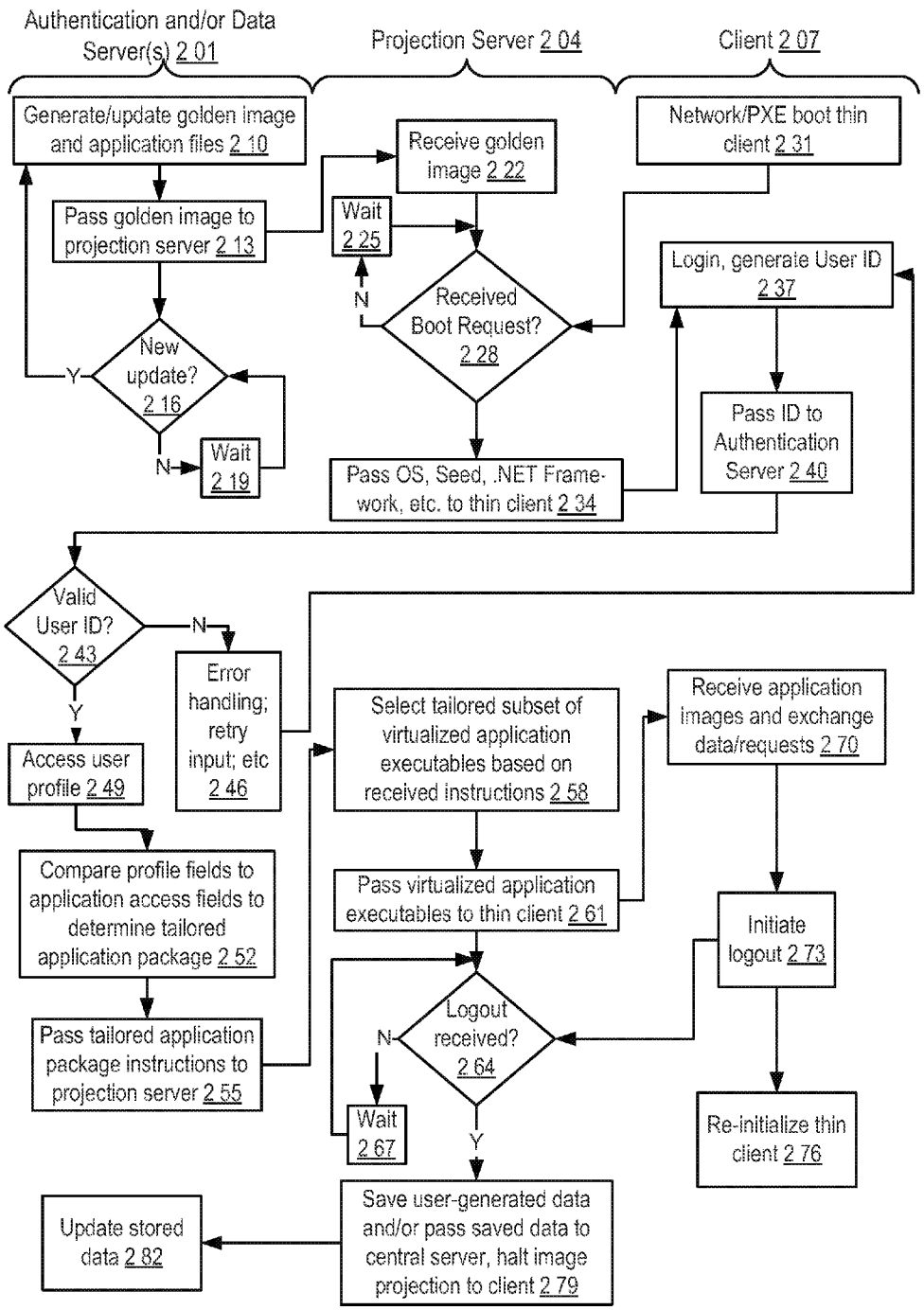

FIGURE 2B

| CLIENT | APPLICATION | TITLE | FUNCTION | SUB FUNCTION | DEPARTMENT | PROGRAM | NAME |
|---|---|---|---|---|---|---|---|
| ALL | NUANCE | SVP | FINANCE | * | ID,REC,COLFIN | * | * |
| Client1 | CALL BAR | AVP | OPERATIONS | * | * | * | * |
| Client2 | CORUS | RVP | OPERATIONS | * | * | * | * |
| Client3 | CORUS | VP | OPERATIONS | * | * | * | * |
| Client4 | PROQOR | EVP | Talent | * | * | * | * |
| Client5 | PROQOR | Agent | * | Center Management | * | * | * |
| Client6 | ASPECT | Sr. Agent | * | * | * | * | * |
| Client6 | PARS | VP | TECHNOLOGY | * | * | * | * |
| Client7 | SOFT PHONE | VP | * | * | * | * | * |
| 285 | 286 | 287 | 288 | 289 | 290 | 291 | 292 |

APPARATUSES, METHODS AND SYSTEMS FOR A DESCRIPTIVE BUSINESS GRAMMAR SYNTAX QUERIER

PRIORITY CLAIM AND RELATED APPLICATIONS

This application is a Continuation of and claims priority under 35 U.S.C. §120 to prior U.S. Non-Provisional application Ser. No. 12/650,542 filed Dec. 31, 2009, entitled "Apparatuses, Methods and Systems for a Descriptive Business Grammar Syntax Querier," which in turn is a Non-Provisional of prior U.S. Provisional Patent Ser. No. 61/252,611 entitled, "Apparatuses Methods and Systems for Tailored and Customizable Management of Enterprise and Human Resources," filed Oct. 16, 2009, to which priority under 35 U.S.C. §119 is claimed.

This disclosure is also related to co-pending U.S. Non-Provisional patent application Ser. No. 12/760,948 filed Apr. 15, 2010, entitled "Apparatuses, Methods and Systems for a Universal Data Librarian,"; U.S. Non-Provisional patent application Ser. No. 12/762,570 filed Apr. 19, 2010, entitled "Apparatuses, Methods and Systems for a Global Data Exchange,"; U.S. Non-Provisional patent application Ser. No. 12/763,331 filed Dec. 30, 2009, entitled "Apparatuses, Methods and Systems for an Automated Data Extractor,"; and U.S. Non-Provisional patent application Ser. No. 12/762,577 filed Apr. 19, 2010, entitled "Apparatuses, Methods and Systems for a Real-Time Desktop Configurer,".

The entire contents of the aforementioned patent are herein expressly incorporated by reference.

FIELD

The present invention is directed generally to apparatuses, methods, and systems of database interfacing, and more particularly, to APPARATUSES, METHODS AND SYSTEMS FOR A DESCRIPTIVE BUSINESS GRAMMAR SYNTAX QUERIER.

BACKGROUND

The advent of ubiquitous computing technologies has yielded a proliferation of electronic data, which is often stored in databases. Databases and the content stored therein may be stored and/or organized in a variety of different schemes and arrangements, such as flat model databases, hierarchical databases, and relational databases. Database management systems have come about, facilitating the creation, control, and management of databases and database content. Some database management systems use database computer languages, such as the structured query language ("SQL"), to facilitate database queries, transactions, and other manipulations. Organizations have employed databases in managing their information.

SUMMARY

The APPARATUSES, METHODS AND SYSTEMS FOR A DESCRIPTIVE BUSINESS GRAMMAR SYNTAX QUERIER (hereinafter "QUERIER") implement efficient and scalable monitoring, regulation, and allocation of computational processing, data, labor, and/or the like resources within an enterprise. The Querier may include facilities for basal tagging to associate entities, employees, transactions, projects and/or assignments, and/or the like business data with various tables in an enterprise database, and the implementation of a descriptive business grammar to access, search, store, manipulate, modify and/or the like stored business data. The Querier allows for engagement of descriptive business grammar phraseology for accessing and/or associating enterprise data, tailoring rules, managing and/or allocating enterprise resources, and/or the like.

In various implementations and embodiments, Querier systems may facilitate: generation and maintenance of a universal business data library; a descriptive business grammar linked to and substantially tracking tables within the universal business data library and search methodologies based thereon; a global data exchange and universal data mapping tool; an automated data extractor; accounting journal entry automation and a chart/report clarifier; elimination of cash reconciliation requirements; invoice generation; a global payroll engine; cost center automation and graphical management; a universal payment integrator; transactional tagging; thin-client virtualization, tailored application provision, and device configuration; softphone configuration and personalization; storage configuration; user interface configuration and personalization; rules-based world wide web restriction; call recording and searching; payclock virtualization; call restriction and regulation; disclosure and/or disclaimer automation; rules-based referral bonus generation and payment tracking; emotional aptitude evaluation; streamlined labor resource allocation; purse-based global benefits planning; universal form resources; an integrated employee training platform; automatic reimbursement facilitation; graphical interactive voice response system programming; hardware asset utilization tracking and reporting; target contact estimation tools; strategic auto-dialing; estimation tools for payment collection efficacy; action sequence tools for collection strategy implementations; and/or the like and use of the Querier.

In one embodiment a database interfacing processor-implemented method is disclosed, comprising: receiving an input string having a syntax grammar format wherein each syntax token correlates to one of a plurality of inter-linked table objects in a database; parsing the input string for each syntax token; generating a database command from a composite of the parsed syntax tokens; and transacting command-specified data with the database using the database command.

In one embodiment, a database interfacing-processor-implemented method is disclosed, comprising: generating a plurality of inter-linked table objects in a database; receiving an input string having a syntax grammar format wherein each syntax token correlates to one of the plurality of inter-linked table objects; parsing the input string for each syntax token; generating a database selection command from a composite of the parsed syntax tokens; querying the database with the selection command; retrieving grammar responsive data based on the querying; and providing the grammar responsive data to at least one receiving application.

In one embodiment, a database interfacing-processor implemented method, comprising: generating an input string having a syntax grammar format wherein each syntax token correlates to one of a plurality of inter-linked table objects in a database; providing the input string to a database management system associated with the database; and transacting data with the database based on the provided input string.

BRIEF DESCRIPTION OF THE DRAWINGS

The accompanying appendices and/or drawings illustrate various non-limiting, example, inventive aspects in accordance with the present disclosure:

FIG. 2A shows an implementation of logic flow for user authentication and application resource allocation in one embodiment of Querier operation;

FIG. 2B shows an implementation of a user interface for specifying user application privileges in one embodiment of Querier operation;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In order to address various issues and improve over the prior art, the invention is directed to apparatuses, methods and systems for a descriptive business grammar syntax querier. It is to be understood that, depending on the particular needs and/or characteristics of a Querier individual and/or enterprise user, database configuration and/or relational model, data type, data transmission and/or network framework, syntax structure, and/or the like, various embodiments of the Querier, may be implemented that enable a great deal of flexibility and customization. The instant disclosure discusses embodiments of the Querier directed to manipulation and storage of business data and enterprise-scale operations. However, it is to be understood that the systems described herein may be readily configured and/or customized for a wide variety of other applications and/or implementations. For example, aspects of the Querier may be adapted for non-enterprise and/or personal data management, efficient data access by mobile devices, and/or the like applications. It is to be understood that the Querier may be further adapted to other implementations or data management applications.

Application Tailoring and Device Virtualization/Configuration

Figure 1:
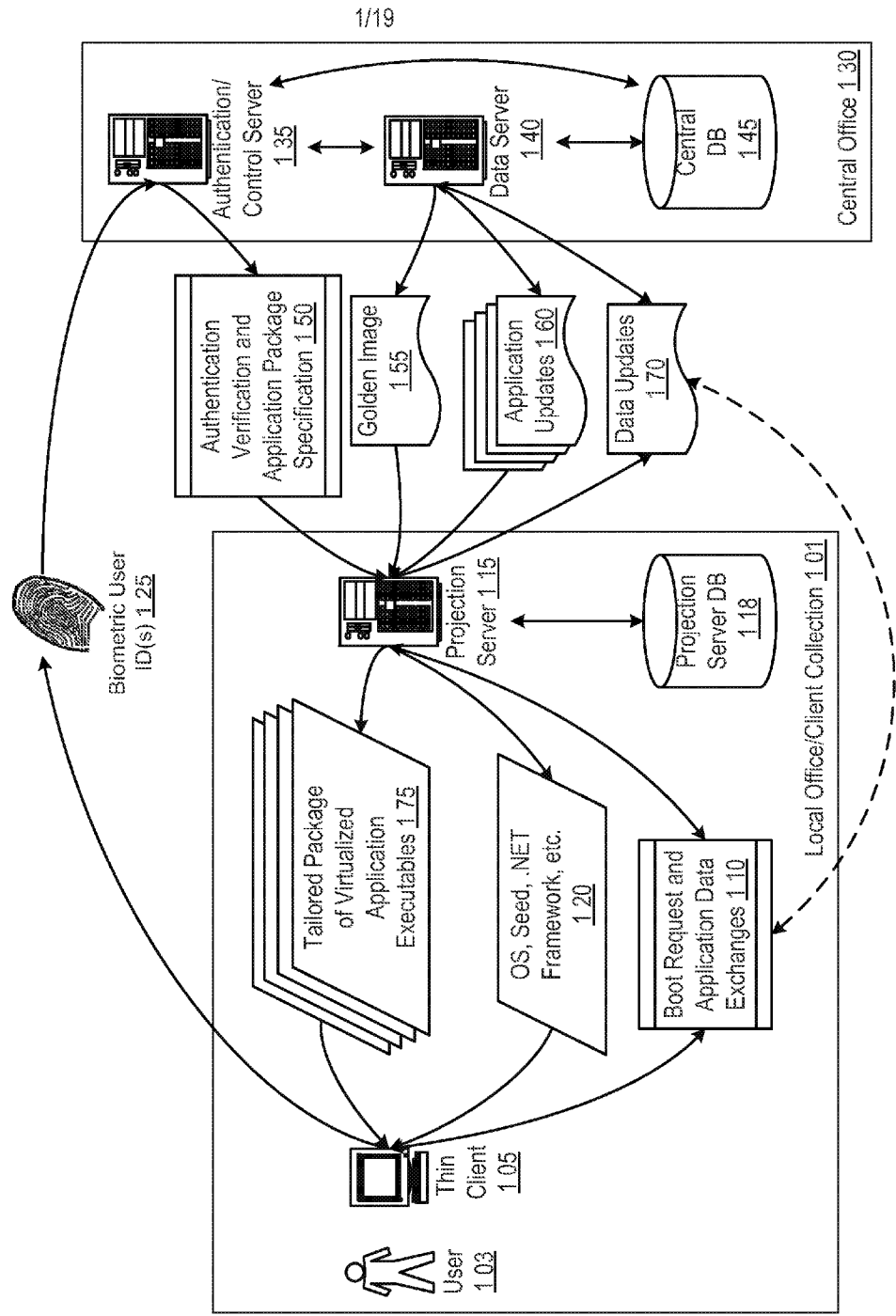
FIG. 1 illustrates an implementation of data flow among and between Querier components and/or affiliated entities for user authentication and application resource allocation in one embodiment of Querier operation.

FIG. 1 illustrates a dataflow of an example embodiment of Querier operation among and between Querier components and/or affiliated entities for user authentication and application resource allocation. A variety of other compositions and arrangements of Querier components and affiliated entities may be used in alternative embodiments of Querier operation. For example, in one embodiment, a Querier, requesting system, and database may all be localized within a single computing terminal. In another embodiment, the Querier may receive input strings over a network from one or more mobile devices and provide access to data from one or more databases in response to such received strings. The data flow shown in FIG. 1 is intended for illustrative purposes only, and to describe aspects of a particular embodiment.

In one embodiment, the Querier includes facilities for thin client virtualization and application tailoring based on user identities and/or profiles. In one implementation, a Querier computing environment may include a local office and/or collection of client terminals 101, wherein each client terminal 105 operated by a user 103 may comprise a thin client. In one implementation, the thin client may have no operating system initially installed. The computing environment may further include a projection server 115 communicatively coupled to the plurality of client terminals 105 in the local office. In one implementation, the projection server 115 may be situated locally with respect to the plurality of client terminals 105. In one implementation, the projection server may comprise a plurality of servers configured as a cloud computing facility. The computing environment may further include a central office facility 130 comprising one or more data 140 and/or authentication servers 135. A data server 140 in the central office may maintain and/or provide access to a central database 145, which may include master copies of one or more operating systems, applications, data files and/or database tables and/or the like. In one implementation, the data server may supply a so-called Golden Master or Golden Image 155 to the projection server 115, such as on a periodic basis, whenever requested by the projection server, whenever updates are made, and/or the like. The Golden Image 155 may, in one implementation, include an operating system destined for installation on one or more client terminals. The Golden Master may include additional files as well in various implementations, such as an authentication application, seed and/or compressed files for other applications, .NET framework files, and/or the like. The data server 140 may further provide a plurality of application files, application file updates 160, data values and/or updates 170, and/or the like to the projection server, which may be destined for installation and/or use on one or more of the client terminals. The projection server 115 may store received application files, data, and/or the like in a projection server database 118. In one implementation, the data server 140 may directly exchange data with one or more client terminals 105, including updated data values, records stored in the central database 145, and/or the like. In one implementation, application files may be "virtualized" prior to installation on the client terminals. In one implementation, application virtualization may be achieved using VMWare Thinapp. In one implementation, application virtualization occurs after application files are received at the projection server. In an alternative implementation, application files are virtualized at the central office, and virtualized application files are then provided to the projection server.

At power on, a client terminal 105 may be configured to boot from a communications network instead of from any local disk. In one implementation, a Preboot Execution Environment (PXE) boot may be engaged to boot the client terminal from the network, wherein the client polls for, contains, and/or is provided an address on the network to obtain boot information and/or to send a boot request. The client terminal's boot request 110 may be relayed to the projection server 115 which, in turn, may provide elements of the Golden Image, such as operating system files, application and/or authentication seed files, .NET framework files, and/or the like 120 for installation at the client terminal. Authentication seed files may then allow a user to submit authentication information in order to identify the user and/or initiate provision of further files and/or application use authorizations. In one implementation, the client terminal may be equipped with one or more biometric login devices (e.g., fingerprint and/or palmprint scanner, retina scanner, facial recognition scanner, earshape recognition scanner, voice recorder, typing rhythm analyzer, and/or the like) configured to admit biometric data associated with a user 125. In one example embodiment, a Digital Persona U.are.U. Fingerprint Reader is employed, which captures an image of the users fingerprint, converts it to a binary format and provides it via a Digital Persona service to the Authentication Control Server 135 server for authentication. In one implementation, software used to engage the one or more biometric login devices is provided from the Golden Image by the projection server to the client terminal after a boot request is made. In one implementation, other authentication measures may be used in place of and/or in addition to biometric authentication, such as use of a password, key device, secret question, and/or the like.

The user may engage the biometric login device and/or any other authentication measures to submit user identification information 125 to an authentication server 135, such as may be located at a central office 130. The authentication server may then verify and/or authenticate the user identification information, such as by comparing it against stored user identification information, e.g., as may be stored in a central database 145, ensuring a match beyond a specified threshold, and/or the like. If a match is detected, the authentication server 135 may query a database (e.g., the central database 145) for a matching user's profile to determine user access authorizations contained therein, such as a package of applications that should be provided to the user. In one implementation, the Querier may employ Microsoft Active Directory for administration of user access and authorizations, which may run on the Data Server. Based on the user identifier (ID) and/or information in an associated user profile, the Querier may determine one or more applications that the user is permitted to access. In one implementation, the applications a user may access may be correlated with one or more of a user's company, a user's department, a user's employment position, a user's location, a user's assignment, and/or the like. The authentication server 135 may provide an instruction 150 to the projection server 115 to provide authorized application files to the client terminal 105 at which the user 103 is logged in. In turn, the projection server may provide application files 175, such as in the form of executable virtualized application files, to the client terminal at which the user is logged in. In one implementation, the user my be required to periodically re-enter login and/or authentication information to ensure that they are still the user of that client terminal, and that another user has not taken their place.

FIG. 2 shows an implementation of logic flow for user authentication and application resource allocation in one embodiment of Querier operation. The implementation in FIG. 2 indicates entities that may perform aspects of the method shown in some implementations, including authentication and/or data server(s) 201, a projection server 204, and a client terminal 207. The authentication and/or data server(s) 201 may generate and/or update a golden image, application files, data tables and/or records, and/or the like 210 and may pass the golden image and/or other updates to the projection server 213, which receives them at 222. The authentication and/or data server(s) may subsequently determine whether to new updates are available for a new golden image 216 and, if not, then wait for a period of time before checking again 219. The projection server, in one implementation, may store the received golden image, application files, data files, and/or the like, such as in a database and/or in temporary storage.

A client terminal may be booted, such as on machine startup, to initiate a network (e.g., PXE) boot 231, passing a boot request over the network, such as to the projection server 204. The projection server 204, in turn, may monitor and/or determine whether a boot request has been received 228. If not, the projection server may wait for a period of time before checking again for a boot request 225. In one embodiment, the boot request may be configured in accordance with the Preboot Execution Environment (PXE) Specification v. 2.1 standard.

Once the request is received, the projection server may pass files and/or data to the client terminal 234, such as by employing HP Image Manager. In one implementation, the projection server may provide all or aspects of the Golden Image to the client terminal, such as operating system files; .NET framework files, Java files, and/or the like; application seed files; authentication and/or login input (e.g., biometric) files; and/or the like. The client starts the boot process and begins to copy and unpackage the materials provided from the projection server. Using files received from the projection server which have been executed/instantiated, a user at the client terminal may login and/or otherwise generate a user ID 237. In one implementation, the user ID generated at 237 comprises a biometric user ID, such as but not limited to a thumbprint or scan; a print or scan of any other finger, combination of fingers, part of the palm, and/or the like; an iris or retina scan; facial image scan; earshape image scan; voice audio data; and/or the like. For example, one of the packages received at the thin client may be DigitalPersona Pro and/or other thumbprint device drivers and capture programs. The generated user ID may then be passed to the authentication and/or data server(s) 240 (e.g., by sending it via the Digital Persona service), which may then determine whether the received ID is valid 243. For example, the send message may convert the image to a binary format, and send it to a server-side component of DigitalPersona Pro fingerprint authentication application, which will perform the recognition/identification of the biometric identifier. In one implementation, this determination may be made based on a comparison of the received ID with stored IDs, stored ID formatting information, and/or the like. If the user ID is determined to be invalid at 243, an error handling procedure may be undertaken, a request may be transmitted for reentry and/or retransmision of the user ID information, and/or the like 246.

For valid user IDs, the authentication and/or data server(s) may access user information and/or a user profile associated with the user ID 249. Accessed user information may then be used to determine which applications to include in a tailored application package for that user 252. For example, in one implementation, a user profile may have fields identifying authorized applications for that user. In another implementation, profile fields may be compared with application access fields defined separately for the applications, and those applications having appropriately matching fields with the user profile may be selected for that user. For example, a user profile and/or other user information may, in one implementation, identify a department code, program code, and/or the like structured syntax string associated with the user (e.g., as may be see in FIGS. 6-7), and various applications may also have associations with various department codes, program codes, and/or the like. The authentication and/or data server(s) may then, in this implementation, instruct provision applications sharing one or more department codes, program codes, and/or the like with those of the user to the user's client terminal. In one implementation, some or all of the determination of which applications to provide to the user may take place at the projection server, and the authentication and/or data server(s) may provide sufficient information to the projection server to allow it to complete the identification of user-appropriate applications.

Once the appropriate package of applications is determined for the user, the authentication and/or data server(s) may pass an instruction message to the projection server 255, the message comprising, in one implementation, specification of applications to be provided to the user. The projection server may receive the instruction and select a package of tailored application files to provide to the client terminal 258. In one implementation, the projection server may select and provide to the client terminal a plurality of virtualized application executable files corresponding to selected applications. For example, FIG. 2B shows an implementation of a user interface for specifying user application privileges in one embodiment of Querier operation. The user interface provides a system administrator with facilities to specify a policy, rule, and/or the like delineating which employees, groups of employees, third parties, and/or the like should receive which applications and/or application packages. In the illustrated implementation, a user may specify at 285 a client and/or group of clients to which a particular specified application distribution and/or access rule and/or policy should be applied. The application may be specified at 286, and characteristics of users, employees, groups, departments, and/or the like who should receive and/or be allowed to use that application may be specified at 287-292. For example, access characteristics may include an employee title 287, an employee function 288, an employee subfunction 289, a department (as may be specified by a department code, which is discussed in further detail below and with reference to FIG. 7) 290, a program (as may be specified by a program code, which is discussed in further detail below and with reference to FIG. 6) 291, an employee name 292, and/or the like. The interface therefore provides both for specification of application privileges for wide classes of users, as well as for user-friendly exception handling whereby a single user or highly specific class of users may be given special access privileges as needed.

In some implementations, application files received from the authentication and/or data server(s) at 222 may be virtualized at the projection server, such as via application of VMWare's Thinapp to the application files to yield virtualized application executables, such as in .EXE format. In another implementation, application files may be virtualized at the authentication and/or data server(s), and the virtualized application executables provided to the projection server for temporary storage until they are to be provided to the client terminals.

In one implementation, virtualized application executables may be pushed to the thin client using a secure file transfer protocol, secure shell (SSH), and/or the like.

The projection server passes the virtualized application executables to the client terminal 261, which receives, unpacackages, and/or runs the files to engage the applications at the client terminal, including exchanges of data related to operation of those applications 270. The projection server may then monitor whether a logout request has been received from the client terminal 264 and, if not, may wait until such a request is received 267. The user at the client terminal may then initiate a logout when he or she is finished with the application session 273, precipitating a re-initialization of the client terminal, whereby data updates are passed over the network to one or more targets, and the client terminal is returned to its pre-login and/or pre-boot state 276. In one embodiment, the terminal may erase (e.g., securely) the contents of its memory to ensure a pre-boot state and enhance security, for example, by issuing root/admin level format command on the storage mechanism, e.g., hard drive. In one implementation, user generated data and/or other saved data may be persisted and/or passed to the authentication and/or data server(s) by the projection server, and projection of application images to the client terminal ceased 279. In an alternative implementation, the client terminal may itself communicate directly with the authentication and/or data server(s) to provide data update information. Data updates received by the authentication and/or data server(s) may be stored and/or persisted, such as in a central database 282.

Figure 3:
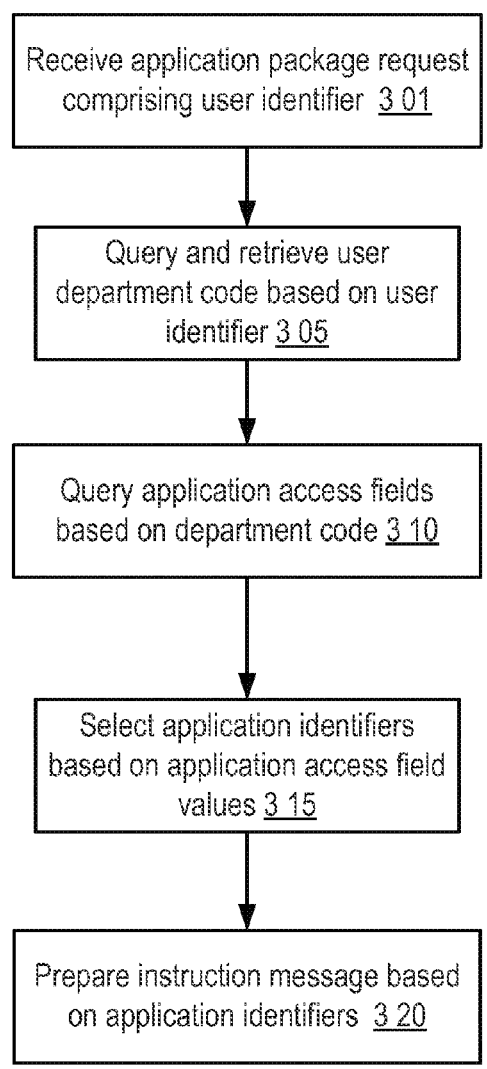
FIG. 3 shows an implementation of logic flow for application tailoring based on department codes in one embodiment of Querier operation.

FIG. 3 shows an implementation of logic flow for application tailoring based on department codes in one embodiment of Querier operation. In one implementation, the method illustrated in FIG. 3 may be operable on an authentication and/or data server. An application package request is received, the request comprising at least a user identifier 301. In another implementation, the request may further comprise a client terminal identifier and/or other information to assist in selecting an application package and/or providing requested applications to a client terminal device. A user department code may be queried based on the user identifier 305, such as, in one implementation, by accessing a user profile containing a department code (e.g., see FIG. 7 for more detail on department codes) associated with the user. A query may then be submitted for application access fields based on the department code 310. In one implementation, application access fields may specify applications accessible to users associated with the particular department code. Application identifiers may be selected based on the application access fields 315, and an instruction message may be prepared including the application identifiers 32o. In an alternative implementation, application identifiers may be directly selected based on a department code and/or other user information, and/or a rules-based system may specify correspondences between application identifiers and department codes and/or other user information. An example of user information for obtaining application access may take a form similar to the following XML example:

```
<user_info>
    <name>John.Smith</name>
    <title>Agent</title>
    <function>Operations</function>
    <subfunction>"blank"</subfunction>
    <department_code>CORP1.OPS.US.CS.TEAM1</department_code>
</user_info>
```

In one implementation, one or more fields of user information (e.g., name and department code) may be mandatory, with remaining fields optional. An example of a instruction message response to user information for application access may comprise a list of application identifiers and may, in one implementation, take a form similar to the following XML example:

```
<response>
<application1>Qallbar</application1>
    <application2>Qorus</application2>
    <application3>CRM</application3>
</response>
```

In one implementation, the instruction message may further include a client terminal device identifier to direct the application files to the appropriate target.

Data Construct and Tracking Syntax

Figure 4:
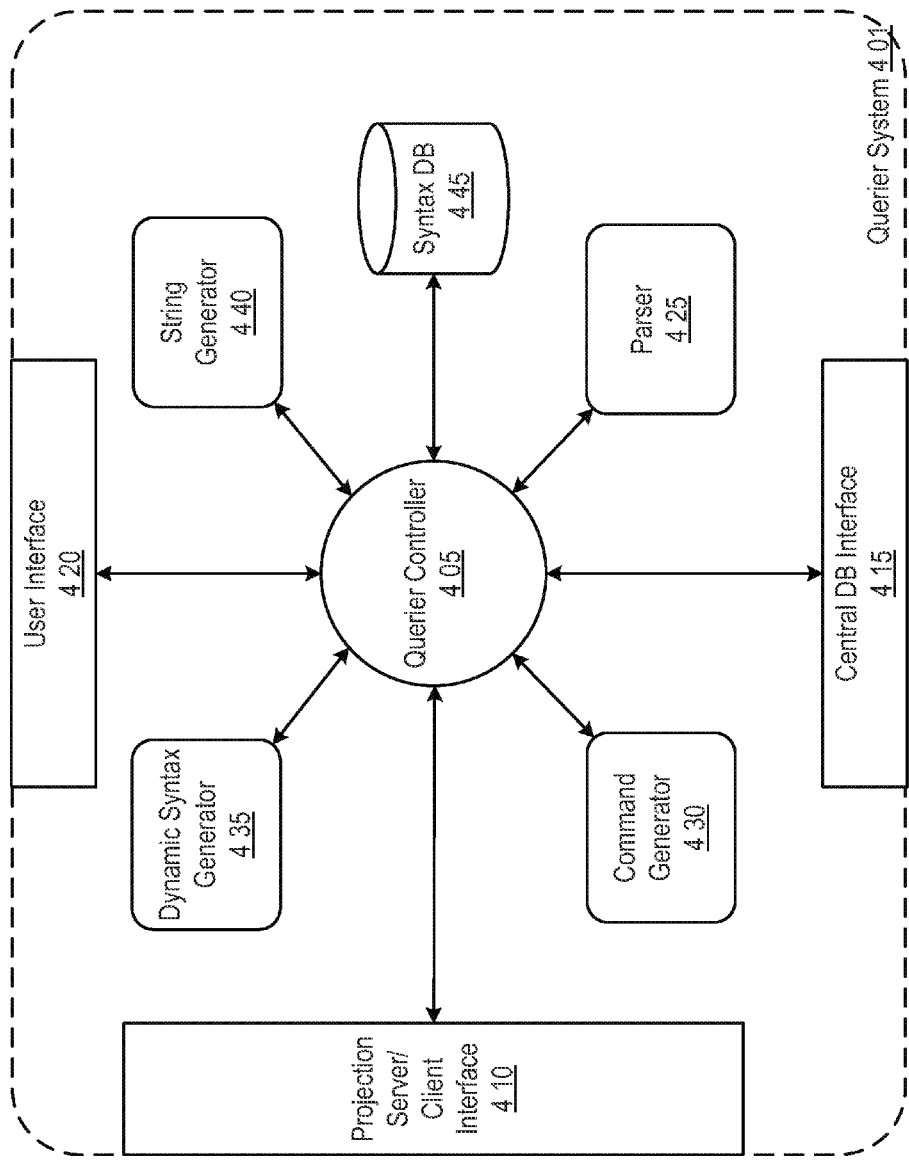
FIG. 4 shows an implementation of data flow between and among Querier system components in one embodiment of Querier operation.

FIG. 4 shows an implementation of data flow between and among Querier system components in one embodiment of Querier operation. The embodiments illustrated in FIG. 4 are directed to a Querier system residing at the Authentication/Control Server 135 and/or Data Server 140 shown in FIG. 1. It is to be understood that aspects of the illustrated embodiment directed to integration with the framework shown in FIG. 1 are for illustrative purposes only, and the Querier system may be deployed in a wide variety of other contexts, including those independent of and apart from the framework illustrated in FIG. 1.

The Querier system 401 may contain a number of operational components and/or data stores. A Querier controller 405 may serve a central role in some embodiments of Querier operation, serving to orchestrate the reception, generation, modification, and distribution of data and/or instructions to, from, and between Querier components and/or mediate communications with external entities and systems.

In one embodiment, the Querier controller 405 may be housed separately from other controllers, modules, components and/or databases within or external to the Querier system, while in another embodiment, some or all of the other modules, components, controllers and/or databases within and/or external to the Querier system may be housed within and/or configured as part of the Querier controller. Further detail regarding implementations of Querier controller operations, modules, components and databases is provided below.

In the implementation illustrated in FIG. 4, the Querier system may be integrated as part of an authentication/control and/or data server, and the Querier controller 405 may be configured to couple to external entities and/or systems via one or more interface components. For example. the Querier controller 405 may be coupled to a projection server/client interface 410. In one implementation, the projection server/client interface 410 may mediate communications to and from a remote projection server and/or one or more client terminals, such as to receive data requests, data inputs, table-tracking syntax configured strings, rule specifications, organizational structure specification and/or inputs, instructions, and/or the like and to return data, rules, instructions, parsed string tokens, generated table-tracking syntax configured strings, and/or the like. The Querier controller 405 may further be coupled to a central database interface 415. In one implementation, the central database interface 415 may mediate communications to and from a remote central database to send parsed string tokens, data updates, rules, data requests, and/or the like and to receive requested data, rules, table identifiers, field identifiers, column identifiers, and/or the like. The Querier controller 405 may further be coupled to a user interface 420. In one implementation, the user interface 420 may mediate communications to and from a user to receive administrator inputs, settings, configuration inputs and/or files, table-tracking syntax configured strings, data requests, data inputs, updates, and/or the like and to send graphical user interface screens, requested data, generated strings, and/or the like. In various implementations, one or more of the interface components described above may serve to configure data into application, transport, network, media access control, and/or physical layer formats in accordance with a network transmission protocol, such as, but not limited to FTP, TCP/IP, SMTP, Short Message Peer-to-Peer (SMPP), and/or the like. For example, the interfaces may be configured for receipt and/or transmission of data to an external and/or network database. The interfaces may further be configurable to implement and/or translate Wireless Application Protocol, VOIP, and/or the like data formats and/or protocols. The interfaces may further house one or more ports, jacks, antennas, and/or the like to facilitate wired and/or wireless communications with and/or within the Querier system.

In one implementation, the Querier controller 405 may further be coupled to a plurality of components configured to implement Querier functionality and/or services. For example, the Querier controller 405 may be coupled to a Parser component 425 which may, in one implementation, be configured to parse received input strings into constituent string tokens and/or otherwise implement interpretation of inputs in accordance with one or more table-tracking syntaxes and/or descriptive business grammars. The Parser component 425 may further be configured to parse inputs into a table-tracking syntax configured input string and attendant data, instructions, requests, and/or the like (e.g., a search query, data input, rule request, and/or the like accompanying a table-specifying input string). The Querier controller 405 may further be coupled to a Command Generator component 430 which may, in one implementation, be configured to generate database manipulation commands, queries, data input and/or storage commands, and/or the like, such as based on tokens extracted from received input strings. For example, in one implementation, the Command Generator component 430 may be configured to receive parsed string tokens, such as from the Parser component 425, and generate a SQL Select command to query data from a Querier database and/or generate a SQL Insert Into command to enter attendant data into a Querier database. Implementations such as these are illustrated in further detail below. The Querier controller 405 may further be coupled to a Dynamic Syntax Generator component 435, which may, in one implementation, be configured to dynamically generate a syntax and/or strings configured with a dynamic syntax in response to user action. For example, in one implementation, the Dynamic Syntax Generator may engage a graphical user interface, such as may be provided to a client terminal via the Projection Server/Client Interface 410 and/or the User Interface 420, that is accessible by a user and that admits inputs indicative of an organizational structure, said inputs instructing the formation and/or organization of the dynamic syntax. The Querier controller 405 may further be coupled to a String Generator component 440, which may, in one implementation, be configured to generate strings in association with various inputs and/or stored data. For example, in one implementation, the String Generator 440 may be configured to generate strings based on organizational hierarchies generated by and/or with the Dynamic Syntax Generator 435. In another implementation, the String Generator 440 may be configured to generate strings matching data queries, such as may be submitted by a user, to see any and/or all syntax-configured strings that match the data query.

In one implementation, the Querier controller 405 may further be coupled to one or more databases configured to store and/or maintain Querier data. A Syntax database 445 may contain information pertaining to string token types and/or sequences, delimiters, string token lengths, syntax identifiers, dynamic syntax parameters, and/or the like. In some implementations, the Querier may compare received input strings with fields and/or records in the Syntax database 445 in order to verify formatting of the input string, assist in parsing the string, and/or the like.

Figure 5A:
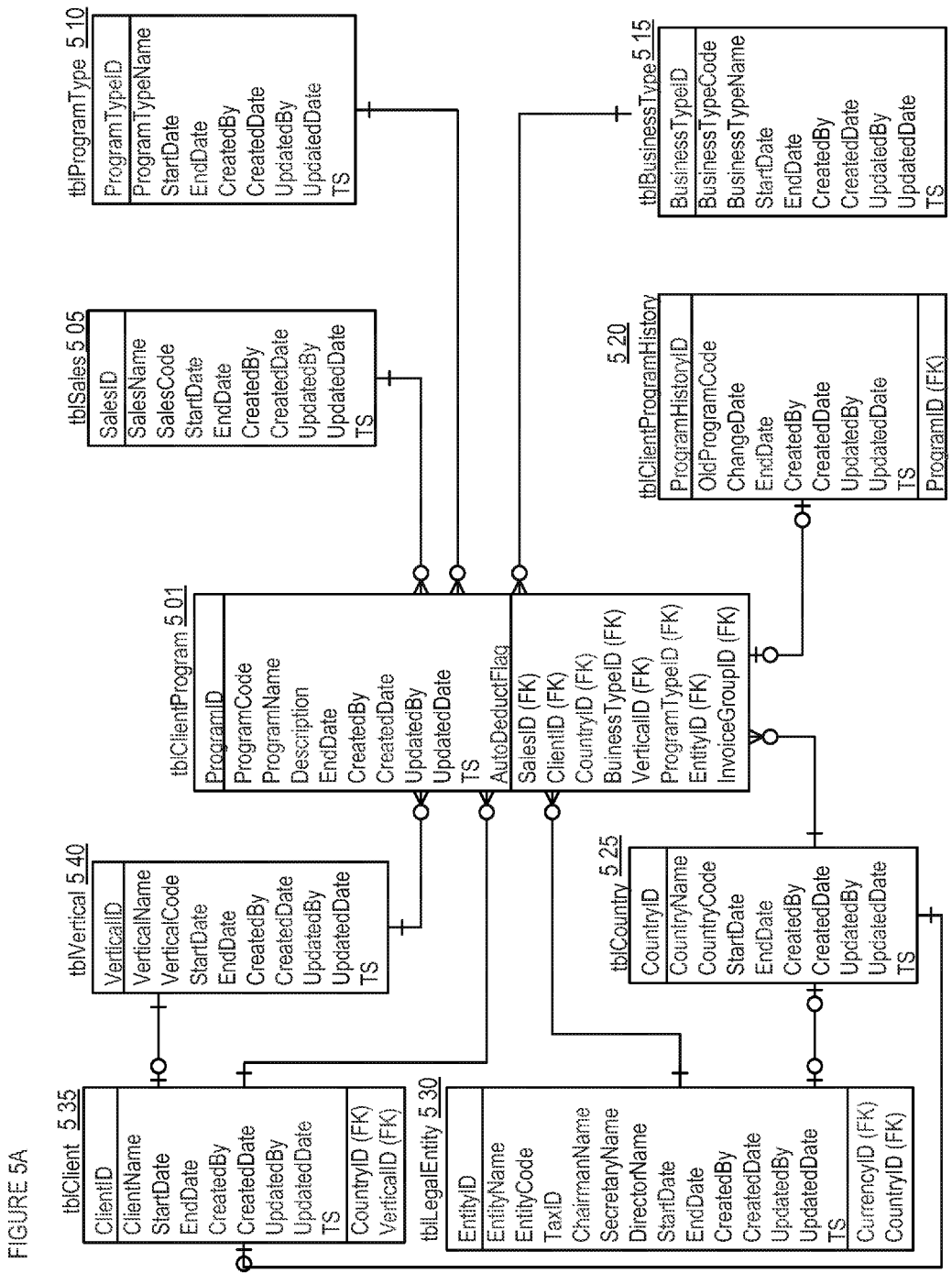
FIGS. 5A-5C show aspects of implementations of data models in one embodiment of Querier operation.
Figure 5B:
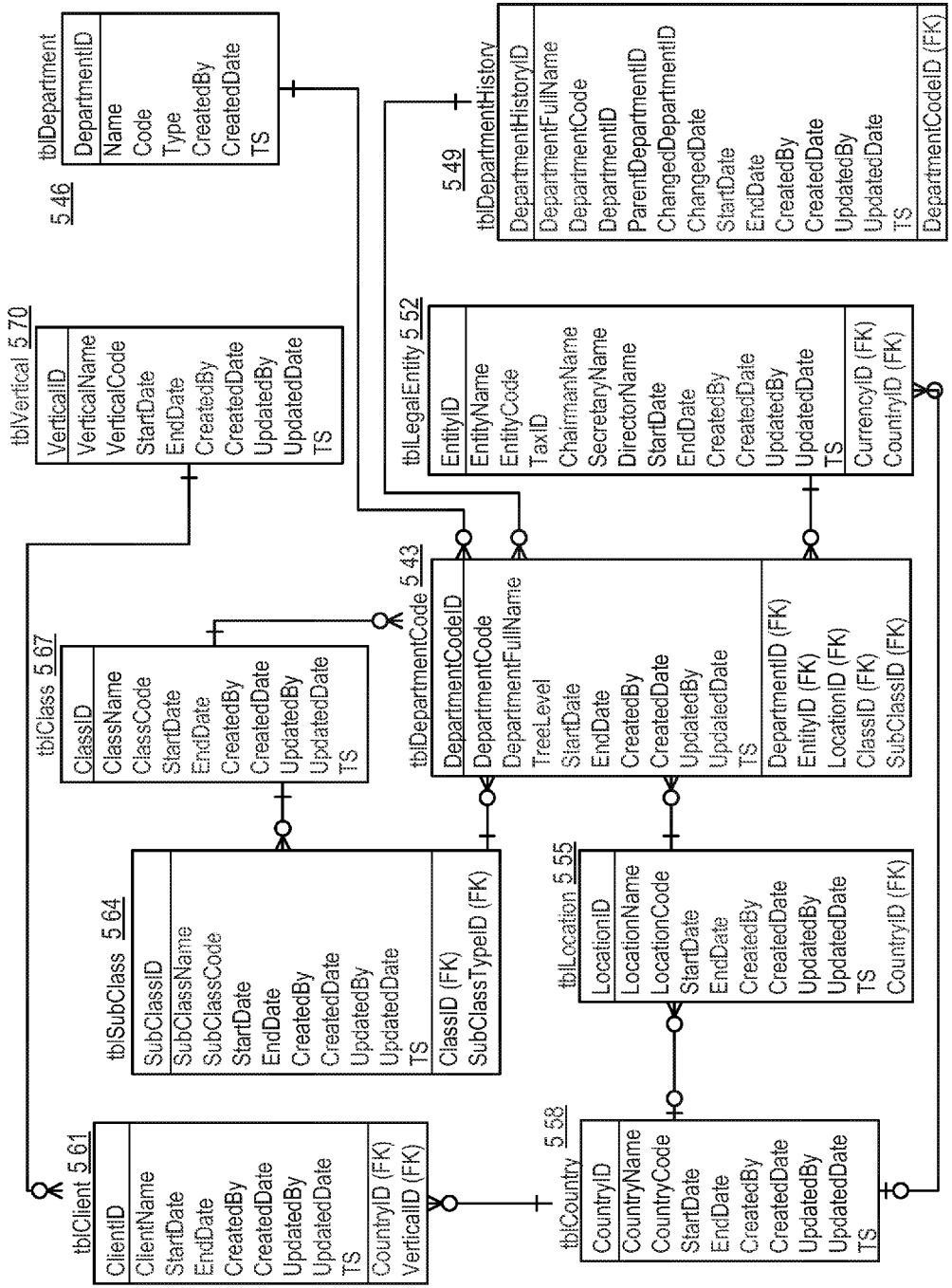
Figure 5C:
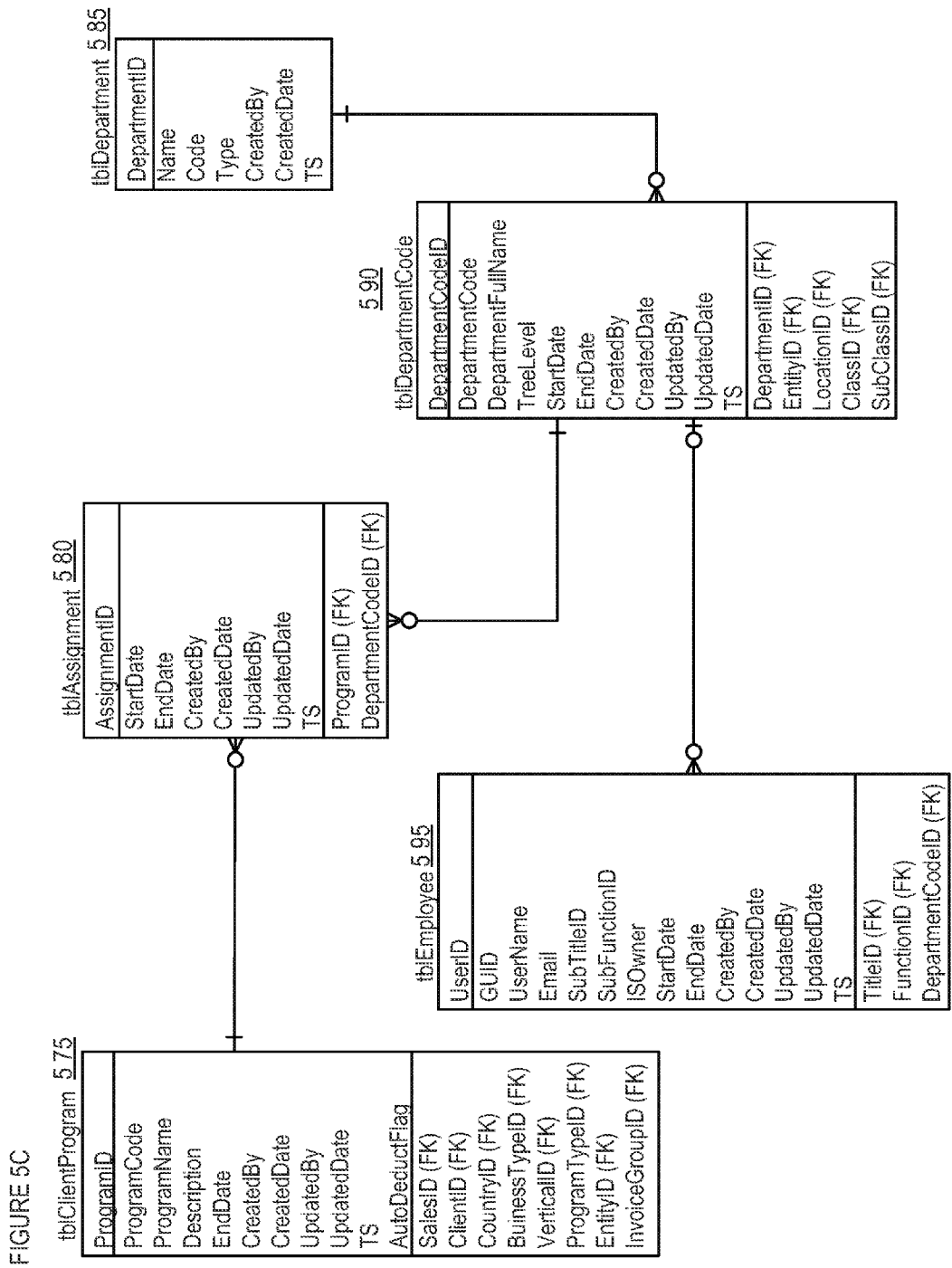

FIGS. 5A-5C show aspects of implementations of data models in one embodiment of QUERIER operation. The tables shown in FIGS. 5A-5C may, in one implementation, be stored in a central database such as that shown at 145 in FIG. 1 and accessible to the Querier via the central database interface 415 in FIG. 4.

FIG. 5A shows an implementation of a data model illustrating relationships among a group of database tables pertaining to Programs. A ClientProgram table 501 may include fields allowing specification of records pertaining to the organization of an enterprise's clients, the type(s) of work performed for them, and/or the like. In one implementation, a ClientProgram table 501 may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. The ClientProgram table 501 may be linked to a variety of other tables, including so-called atomic-level tables, via the foreign keys specified therein. For example, the ClientProgram table 501 may be linked to a Sales table 505, which may include fields allowing specification of records pertaining to sales made in association with a particular client, type of work performed for them, and/or the like. In one implementation, a Sales table 505 may include fields such as, but not limited to: SalesID, SalesName, SalesCode, StartDate, EndDate, CreatedBy, CreatedDate, UpdatedBy, UpdatedDate, TS, and/or the like. The ClientProgram table 501 may further be linked to a ProgramType table 510, which may include fields allowing specification of records pertaining to the types of work performed for clients. In one implementation, a ProgramType table 510 may include fields such as, but not limited to: ProgramTypeID, ProgramTypeName, StartDate, EndDate, CreatedBy, CreatedDate, UpdatedBy, UpdatedDate, TS, and/or the like. The ClientProgram table 501 may further be linked to a BusinessType table 515, which may include fields allowing specification of records pertaining to the types of businesses associated with clients, the types of business between an enterprise and a client, and/or the like. In one implementation, a BusinessType table 515 may include fields such as, but not limited to: BusinessTypeID, BusinessTypeCode, BusinessTypeName, StartDate, EndDate, CreatedBy, CreatedDate, UpdatedBy, UpdatedDate, TS, and/or the like. The ClientProgram table 501 may further be linked to a ClientProgramHistory table 520, which may include fields allowing specification of records pertaining to historical and/or time-resolved client programs. In one implementation, a ClientProgramHistory table 520 may include fields such as, but not limited to: ProgramHistoryID, OldProgramCode, ChangeDate, EndDate, CreatedBy, CreatedDate, UpdatedBy, UpdatedDate, TS, ProgramID (FK), and/or the like. The ClientProgram table 501 may further be linked to a Country table 525, which may include fields allowing specification of records pertaining to countries. In one implementation, a Country table 525 may include fields such as, but not limited to: CountryID, CountryName, CountryCode, StartDate, EndDate, CreatedBy, CreatedDate, UpdatedBy, UpdatedDate, TS, and/or the like. The ClientProgram table 501 may further be linked to a LegalEntity table 530, which may include fields allowing specification of records pertaining to legal entity status, tax status, personnel and/or the like of enterprises, clients, and/or the like. In one implementation, a LegalEntity table 530 may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. The ClientProgram table 501 may further be linked to a Client table 535, which may include fields allowing specification of records pertaining to clients and/or client information. In one implementation, a Client table 535 may include fields such as, but not limited to: ClientID, ClientName, StartDate, EndDate, CreatedBy, CreatedDate, UpdatedBy, UpdatedDate, TS, CountryID (FK), VerticalID (FK) and/or the like. The ClientProgram table 501 may further be linked to a Vertical table 540, which may include fields allowing specification of records pertaining to market and/or industry categories, and/or the like. In one implementation, a Vertical table 540 may include fields such as, but not limited to: VerticalID, VerticalName, VerticalCode, StartDate, EndDate, CreatedBy, CreatedDate, UpdatedBy, UpdatedDate, TS, and/or the like.

In some implementations, links may exist between lower-level and/or atomic-level tables as well. For example, in the illustrated implementation, the Client table 535 is linked to the Country table 525 and to the Vertical table 540; and the LegalEntity table 530 is linked to the Country table 525. Some tables linked by foreign keys to tables shown in FIG. 5A have been omitted from illustration for the sake of clarity.

FIG. 5B shows an implementation of a data model illustrating relationships among a group of database tables pertaining to Departments. A DepartmentCode table 543 may include fields allowing specification of records pertaining to departments within an enterprise, the organization of the enterprise's departments, and/or the like. In one implementation, a DepartmentCode table 543 may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. The DepartmentCode table 543 may be linked to a variety of other tables, including so-called atomic-level tables, via the foreign keys specified therein. For example, the DepartmentCode table 501 may be linked to a Department table 546, which may include fields allowing specification of records pertaining to departments within an enterprise, and/or the like. In one implementation, a Department table 546 may include fields such as, but not limited to: DepartmentID, Name, Code, Type, CreatedBy, CreatedDate, TS, and/or the like. The DepartmentCode table 543 may further be linked to a DepartmentHistory table 549, which may include fields allowing specification of records pertaining to the history of department assignments and/or characteristics, and/or the like. In one implementation, a DepartmentHistory table 549 may include fields such as, but not limited to: DepartmentHistoryID, DepartmentFullName, DepartmentCode, DepartmentID, ParentDepartmentID, ChangedDepartmentID, ChangedDate, StartDate, EndDate, CreatedBy, CreatedDate, UpdatedBy, UpdatedDate, TS, and/or the like. The DepartmentCode table 543 may further be linked to a LegalEntity table 552, which may include fields allowing specification of records pertaining to legal entity status, tax status, personnel and/or the like of enterprises, clients, and/or the like. In one implementation, a LegalEntity table 552 may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. The LegalEntity table 552 may, in turn, be linked to a Country table 558, which may include fields allowing specification of records pertaining to countries. In one implementation, a Country table 558 may include fields such as, but not limited to: CountryID, CountryName, CountryCode, StartDate, EndDate, CreatedBy, CreatedDate, UpdatedBy, UpdatedDate, TS, and/or the like. In the illustrated implementation, the country code may further be linked to a Client table 561, which may include fields allowing specification of records pertaining to clients and/or client information. In one implementation, a Client table 561 may include fields such as, but not limited to: ClientID, ClientName, StartDate, EndDate, CreatedBy, CreatedDate, UpdatedBy, UpdatedDate, TS, CountryID (FK), VerticalID (FK) and/or the like. The Client table 561, in turn, may be linked to a Vertical table 570, which may include fields allowing specification of records pertaining to market and/or industry categories, and/or the like. In one implementation, a Vertical table 570 may include fields such as, but not limited to: VerticalID, VerticalName, VerticalCode, StartDate, EndDate, CreatedBy, CreatedDate, UpdatedBy, UpdatedDate, TS, and/or the like. The DepartmentCode table 543 may further be linked to a Location table 555, which may include fields allowing specification of enterprise locations, and/or the like. In one implementation, a Location table 555 may include fields such as, but not limited to: LocationID, LocationName, LocationCode, StartDate, EndDate, CreatedBy, CreatedDate, UpdatedBy, UpdatedDate, TS, CountryID (FK), and/or the like. The Location table 555 may, in turn, be linked to the Country table 558. The DepartmentCode table 543 may further be linked to a Class table 567, which may include fields allowing specification of records pertaining to classes, such as accounting classes, associated with enterprises, departments, and/or the like. In one implementation, a Class table 567 may include fields such as, but not limited to: ClassID, ClassName, ClassCode, StartDate, EndDate, CreatedBy, CreatedDate, UpdatedBy, UpdatedDate, TS, and/or the like. The DepartmentCode table 543 may further be linked to a SubClass table 564, which may include fields allowing specification of records pertaining to subclasses, such as accounting subclasses, associated with enterprises, departments, and/or the like. In one implementation, a SubClass table 564 may include fields such as, but not limited to: SubClassID, SubClassName, SubClassCode, StartDate, EndDate, CreatedBy, CreatedDate, UpdatedBy, UpdatedDate, TS, ClassID (FK), SubClassTypeID (FK), and/or the like.

In some implementations, links may exist between lower-level and/or atomic-level tables as well. For example, in the illustrated implementation, the Class table 567 is linked to the SubClass table 564. Some tables linked by foreign keys to tables shown in FIG. 5B have been omitted from illustration for the sake of clarity.

FIG. 5C shows an implementation of a data model illustrating relationships among a group of database tables pertaining to Assignments and Employees/Users. An Assignment table 580 may include fields allowing specification of records pertaining to assignments, such as within an enterprise, performed for or on behalf of a client, by a department, and/or the like. In one implementation, an Assignment table 580 may include fields such as, but not limited to: AssignmentID, StartDate, EndDate, CreatedBy, CreatedDate, UpdatedBy, UpdatedDate, TS, ProgramID (FK), DepartmentCodeID (FK), and/or the like. The Assignment table 580 may be linked to a variety of other tables, including so-called atomic-level tables, via the foreign keys specified therein. For example, the Assignment table 580 may be linked to a ClientProgram table 575, which may include fields allowing specification of records pertaining to the organization of an enterprise's clients, the type(s) of work performed for them, and/or the like. In one implementation, a ClientProgram table 575 may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. The Assignment Table 580 may further be linked to a Department Code table 590, which may include fields allowing specification of records pertaining to departments within an enterprise, the organization of the enterprise's departments, and/or the like. In one implementation, a DepartmentCode table 590 may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. In the illustrated implementation, the DepartmentCode table 590 is further linked to a Department table 585, which may include fields allowing specification of records pertaining to departments within an enterprise, and/or the like. In one implementation, a Department table 585 may include fields such as, but not limited to: DepartmentID, Name, Code, Type, CreatedBy, CreatedDate, TS, and/or the like.

An Employee table 595 may include fields allowing specification of records pertaining to user and/or employee attributes and/or characteristics, and/or the like. In one implementation, an Employee table 595 may include fields such as, but not limited to: UserID, GUID, UserName, Email, SubTitleID, SubFunctionID, ISOwner, StartDate, EndDate, CreatedBy, CreatedDate, UpdatedBy, UpdatedDate, TS, TitleID (FK), FunctionID (FK), DepartmentCodeID, and/or the like. Some tables linked by foreign keys to tables shown in FIG. 5C have been omitted from illustration for the sake of clarity.

Figure 6:
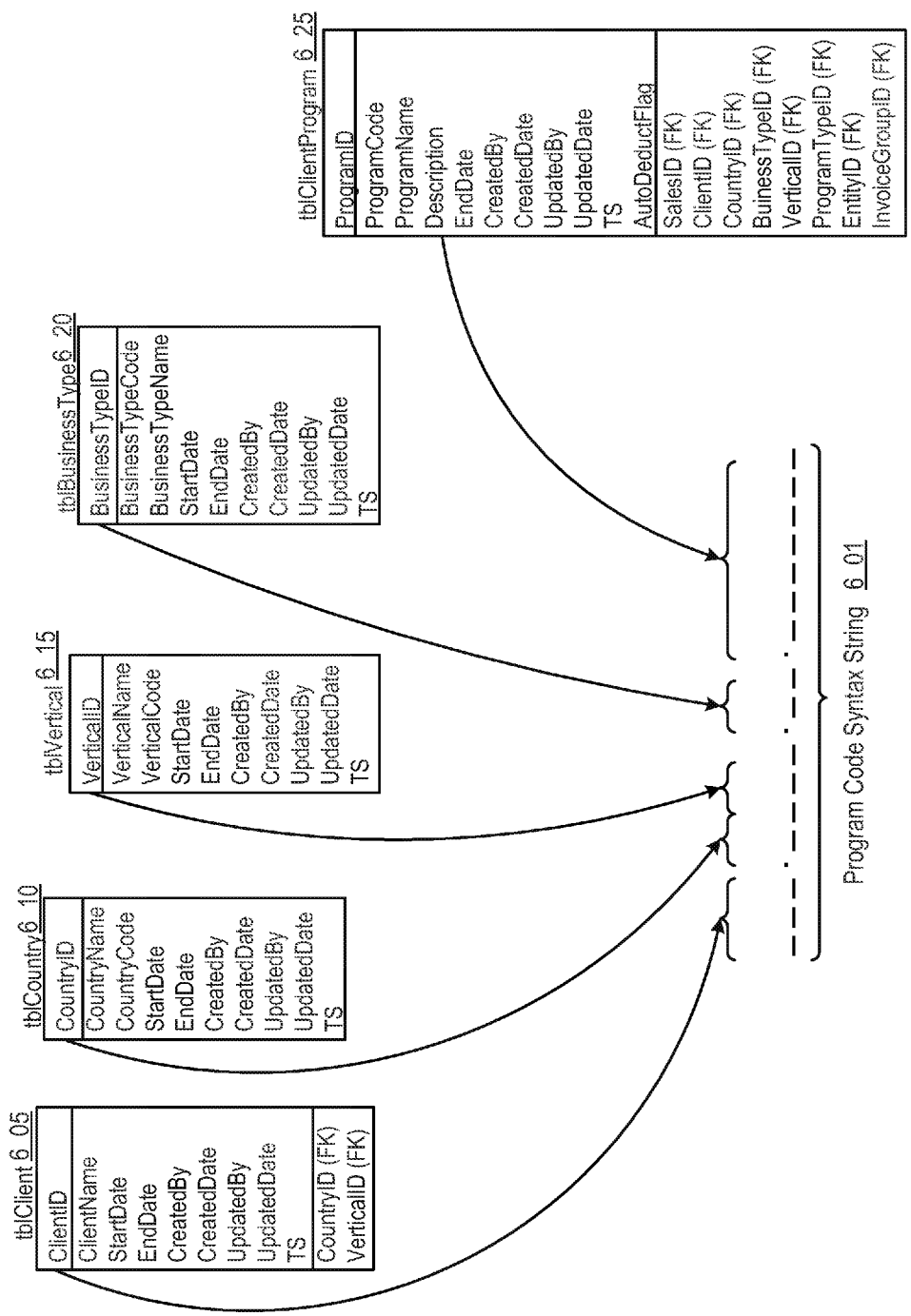
FIG. 6 shows an implementation of a table-tracking string syntax in one embodiment of Querier operation.

FIG. 6 shows an implementation of a table-tracking string syntax in one embodiment of Querier operation. In one embodiment, each token in a business grammar syntax 601 tracks to an individual table, e.g., FIGS. 5A-C, 605-625. As such, any token used between grammar eliminators may be parsed and supplied as targets as part of an SQL (e.g., Select) command to a Querier database.

A string is shown at 601 that is configured in accordance with a table-tracking grammar syntax whereby delimited string tokens correlate with and/or correspond to tables in the database. For example, in the illustrated implementation, the string comprises a series of tokes delimited by periods, wherein each token admits a table identifier value corresponding to one of the indicated tables. The first token of the string at 601 corresponds to a Client table 605 and may, in one implementation, admit values for the ClientID field. The second token of the string at 601 corresponds to a Country table bio and may, in one implementation, admit values for the CountryID field. The third token of the string at 601 corresponds to a Vertical table 615 and may, in one implementation, admit values for the VerticalID field. The fourth token of the string at 601 corresponds to a BusinessType table 62o and may, in one implementation, admit values for the BusinessTypeID field. In some implementations, the table-tracking string syntax may also include table fields other than table identifier fields. For example, while the fifth token of the string at 601 may be said to correspond to or correlate with a ClientProgram table 625, the token itself admits values for the Description field of that table.

In various implementations of a table-tracking string syntax, various punctuation marks, character, and/or the like (e.g., periods, commas, dashes, blank spaces, hash marks, dollar signs, asterisks, and/or the like and/or any combination or sequence thereof) may be used in different combinations and arrangements to delimit string tokens. For example, in one implementation, periods may be placed between pairs of string tokens (e.g., the period between the client and country tokens in the string at 601). In one implementation, every pair of string tokens is separated by delimiting punctuation, such as a period. In another implementation, one or more pairs of tokens may have alternative punctuation and/or characters delimiting them than other token pairs, and/or may have no delimiting punctuation and/or characters whatsoever. For example, the country token 610 and vertical token 615 in the string at 601 are not delimited by any additional characters or punctuation. In one implementation, a string interpreting component may have a pre-set token length stored for a given table-tracking syntax and may parse the string based, for example, on the number of characters at a certain point in the string, following a particular delimiter, and/or the like.

In some implementations, the table-tracking syntax may comprise a descriptive business grammar having string tokens that correspond to table fields determined and/or expected to have strong descriptive correlation with business properties and/or behaviors. For example, the implementation of a program code string syntax shown in FIG. 6 has string tokens corresponding to a client name, country, vertical (e.g., industry, company position in a supply chain, and/or the like), business type (e.g., nature of services provided to a client), and a client program description. Any of a wide variety of other tables and/or table fields may be correlated with string tokens in other implementations of descriptive business grammars. In one implementation, tables and/or table fields comprising a string syntax in a descriptive business grammar may be selected by a Querier administrator. In an alternative implementation, tables and/or table fields having strong descriptive correlation with business properties and/or behaviors may be determined systematically by selecting one or more business properties and/or behaviors of interest (e.g., size, revenue, common business rules, and/or the like) and performing a discriminant analysis, classification and/or regression tree analysis, and/or the like statistical analysis to select a subset of tables and/or table fields from a larger set, the subset having maximal correlation with the business properties and/or behaviors of interest.

In one implementation, a table-tracking string syntax may take a form that is static and pre-set, such that the number, arrangement, selection, and/or the like of string tokens is fixed and/or substantially the same for each instance of a string formed in accordance with the syntax. In another implementation, a table-tracking string syntax may be formed dynamically, such as based on user inputs, and different strings formed in accordance with the syntax may appear different, have a different number, selection, arrangement, and/or the like of tokens and/or the like. For example, hierarchical properties of a system (e.g., departments of an organization) may be indexed with a dynamic table-tracking string syntax having a selection and/or number of tokens representing a position of a given property within the hierarchy. FIG. 7 shows a schematic illustration of correlations between positions within an organizational hierarchy and corresponding strings configured with a dynamic, hierarchical table-tracking syntax in one embodiment of Querier operation. The organizational hierarchy 701 is configured as a tree depicting departments within an organization, with each node of the tree representing a descriptor or characteristic of a corresponding department, division, and/or the like. In turn, each displayed characteristic may correspond to a table, table identifier, table field, and/or the like in a database. The root node 710 corresponds to the organization depicted (XYZ Corp.) and may represent a table field and/or table identifier for, for example, a EntityID, EntityName, ClientID, ClientName, and/or the like. Also depicted in the figure are a series of so-called Department Codes 705 comprising dynamic, hierarchical table-tracking syntax configured strings correlated with nodes in the organizational hierarchy 701, wherein each token in the string corresponds to and/or correlates with one of the descriptors and/or characteristics of the organizational department represented at a given node of the organizational hierarchy tree 701. In one implementation, a department code configured with a dynamic, hierarchical table-tracking syntax may include any and/or a particular class of logical arrangements of descriptors, including but not limited to: function, sub-function, country, location, vertical, business type, client, team, and/or the like.

For example, the root node depicting the identity of the organization, XYZ Corp. 710, has a corresponding department code of "XYZ" 715. A sub-node emanating from the root note, such as the "Analytics" department shown at 720, may then have a corresponding department code with a root token as in 715, but with the addition of a new token (ANA) delimited from the root token to yield XYZ.ANA 725. The addition of further levels of hierarchy may add further tokens to the string syntax. Depending on the hierarchical arrangement of organizational descriptors in the organizational tree 701, different department codes 705 may be generated having tokens in similar positions in the strings which, nevertheless, correspond to different types of descriptors, different tables, different table identifiers, and/or the like. For example, in the illustrated implementation, the department code at 730, XYZ.MAR.US.LA, has a concluding token "LA" indicating a location of the department (i.e., in Los Angeles 735). On the other hand, the department code at 740, XYZ.OPS.CA.A, has a concluding token "A" that is also in the fourth position of the string but, here, indicates a team affiliation (i.e., Team A 745). In one implementation, the Querier may parse a dynamic, hierarchical table-tracking syntax configured string in a hierarchical manner, proceeding from a root token which may, in some implementations, always correspond to a particular table, table identifier, table field, and/or the like, and then progressively comparing subsequent string tokens to table fields and/or linked tables until matches are found permitting identification of the tables, table identifiers, table fields, and/or the like to which the string tokens correspond. As such, the number of delimiters may indicate the relative hierarchical position of a value, but the tokens within the delimiters may represent the types of categorization; this has the very powerful advantage allowing for orthogonal constructs of disparate data types within the grammar without excess duplication of descriptors and greater number of descriptive permutations; for example, it allows for the decoupling of business categories of information from accounting categories, while allowing permutations therebetween.

Figure 7A:
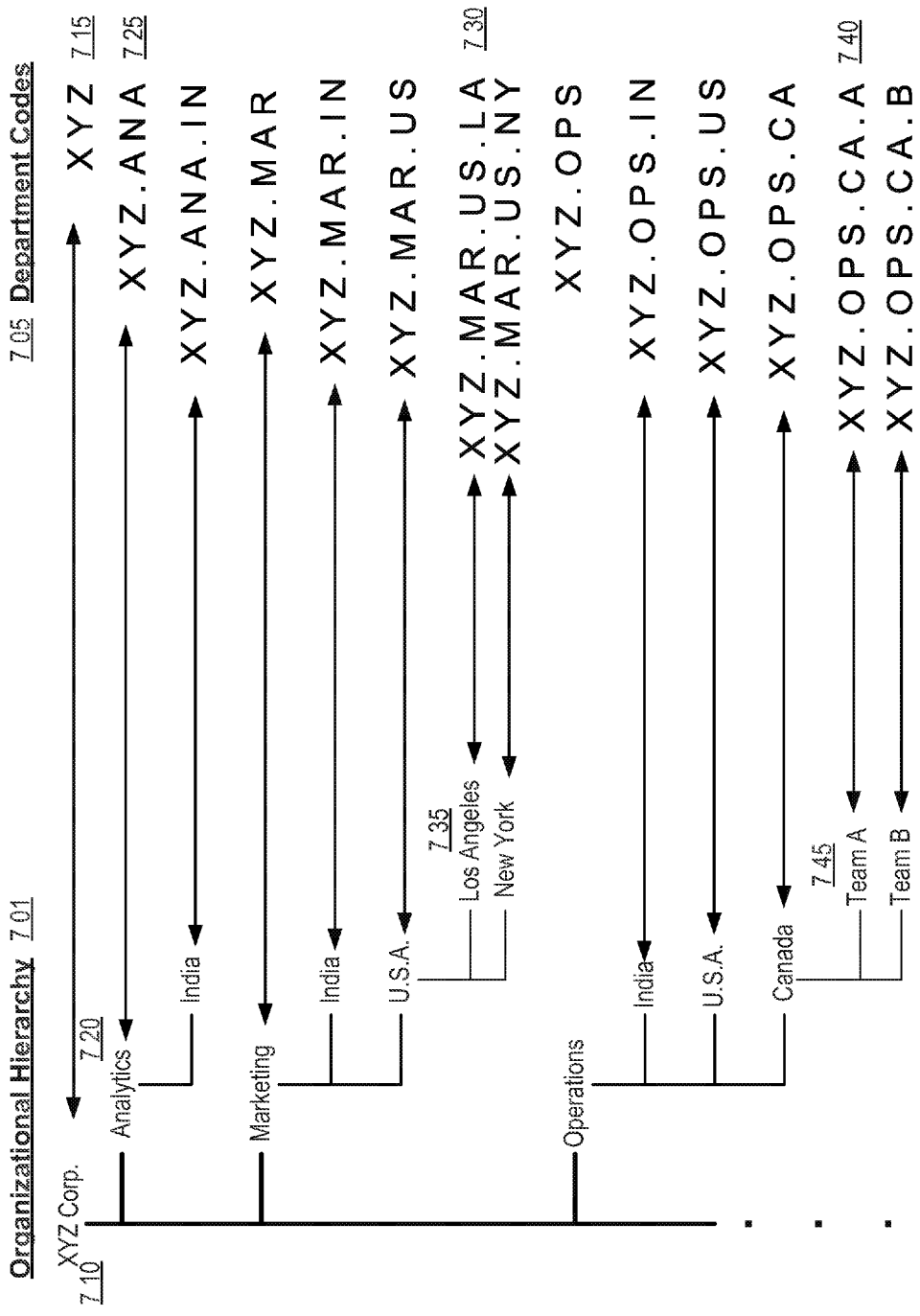
FIG. 7 shows a schematic illustration of correlations between positions within an organizational hierarchy and corresponding strings configured with a dynamic, hierarchical table-tracking syntax in one embodiment of Querier operation.
Figure 7B:
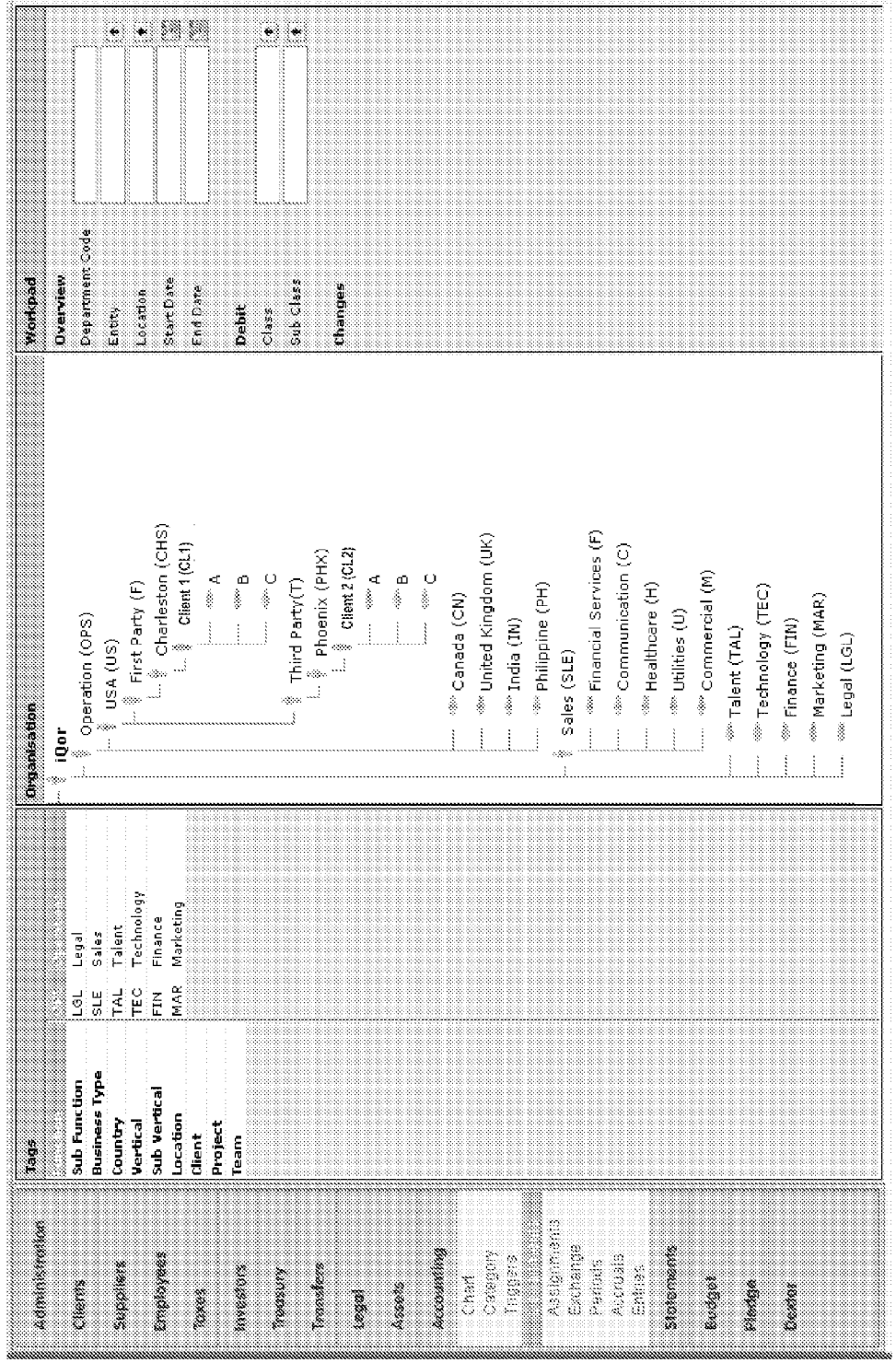

In one embodiment, the Querier may include a user interface facility similar in appearance to the schematic illustration shown in FIG. 7A permitting a graphical generation of a hierarchical organizational chart and corresponding dynamic, hierarchical table-tracking syntax configured strings, such as the department codes shown at 705 (see FIG. 7B illustrating an example UI screenshot). For example, such a user interface may include a plurality of organizational descriptors, such as function, sub-function, country, location, vertical, business type, client, team, and/or the like, that are configured as selectable interface elements. The organizational chart may then be generated by selecting the descriptors for association with different positions in the chart, causing new nodes to be created from those positions. In one implementation, each descriptor may be dragged and dropped from a bank of descriptors to a position on or near the chart, causing that descriptor to become a new node extending by a branch from the nearest node above it in the hierarchy. The Querier may also automatically generate a new department code corresponding to the new node by appending a token corresponding to the new node to the string corresponding to the next highest node in the chart from the new node.

Figure 8:
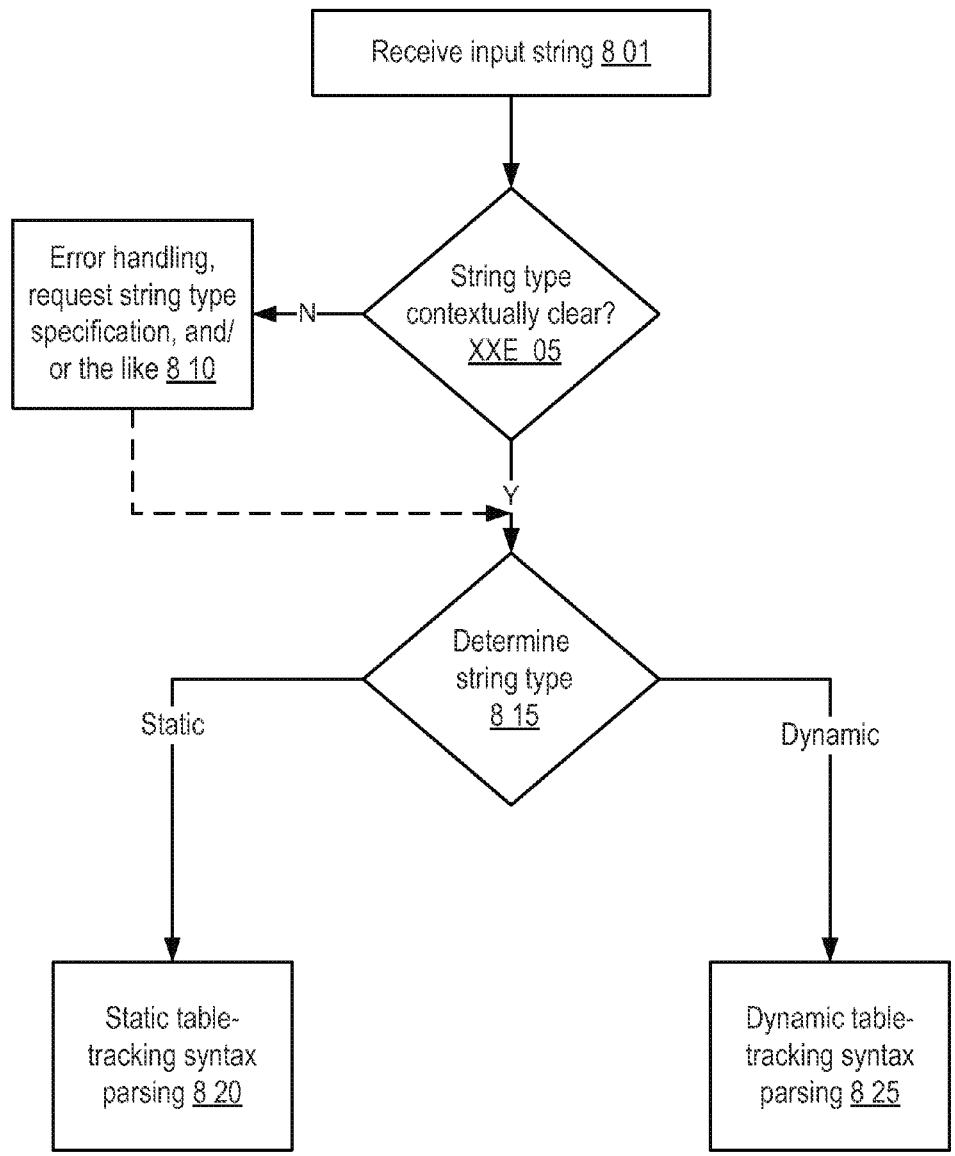
FIG. 8 shows an implementation of logic flow for string type discerning and parsing in one implementation of Querier operation.

FIG. 8 shows an implementation of logic flow for string type discerning and parsing in one implementation of Querier operation. The implementation illustrated in FIG. 8 may be employed, for example, in a circumstance wherein both static and dynamic table-tracking syntaxes are used and strings configured with either syntax may be received as inputs. The Querier may receive an input string 801, such as via a web interface, a text and/or command line input, data transfer from another Querier application and/or component, selection of input string tokens in a graphical user interface (e.g., from one or more pull-down menus), string tokens spoken into a microphone and analyzed with speech recognition software, a string scanned from a document and/or discerned from a photograph that is analyzed such as with optical character recognition (OCR), and/or the like. A determination may then be made as to whether the string type, associated table-tracking syntax and/or descriptive business grammar, and/or the like is clear from the context in which the string was input, and/or from the content of the string itself 805. For example, in one implementation, a string type may be identified from the application into which the string was input and/or the method of input and/or receipt of the input string. In another example, a string type may be identified from the length, composition, arrangement, content, and/or the like of the string itself. The input string may be compared to elements of a syntax database, which delineate the formal characteristics of a particular table-tracking syntax and allow for determination of whether a particular input string appears to be configured in accordance with the particular syntax. In one implementation, the Querier at 805 may determine whether sufficient indicia of string type exist to permit a determination of the string type. In one implementation, the Querier at 805 may only determine whether sufficient indicia exist to distinguish the string type and/or associated syntax between static table-tracking syntax and a dynamic table-tracking syntax.

If sufficient indicia do not exist to distinguish the type of string and/or syntax corresponding to an input string, the Querier may undertake an error handling process, request user specification of the string type, perform additional analysis on the input string to discern the type, and/or the like 810. If sufficient indicia are present at 805, the Querier may determine which string type and/or string syntax is associated with the input string, such as based on that indicia 815. In one implementation, the Querier may distinguish between a string configured in accordance with a static table-tracking index and with a dynamic table-tracking index. In the illustrated implementation, a static table-tracking syntax configured input string may then be subjected to a static table-tracking syntax parsing 820, and a dynamic table-tracking syntax configured input string may be subjected to a dynamic table-tracking syntax parsing 825.

Figure 9:
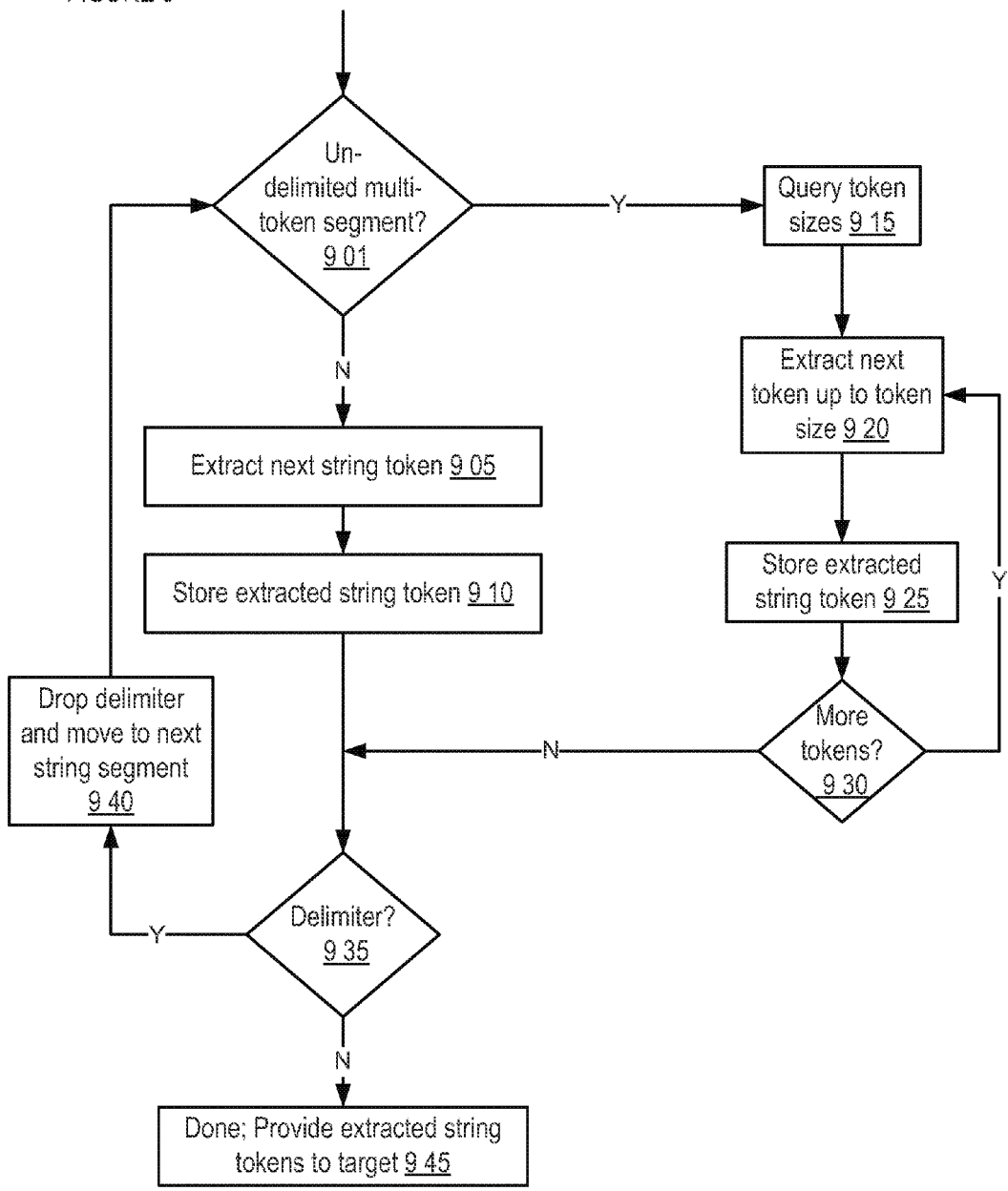
FIG. 9 shows an implementation of logic flow for static table-tracking syntax parsing in one embodiment of Querier operation.

FIG. 9 shows an implementation of logic flow for static table-tracking syntax parsing in one embodiment of Querier operation. A determination may be made as to whether a first segment of the received string and/or corresponding string syntax comprises a single token or an undelimited multi-token segment 901. In the latter case, the Querier may query a token size 915, such as from a syntax database that holds a list of table names, token sizes, and/or the like, and extract a next token from the undelimited multi-token segment based on the token size 920. In one implementation, a token size may be specified as part of the table-tracking syntax and/or descriptive business grammar. In another implementation, such as for a dynamic table-tracking syntax, a token size may be specified as a maximum number of characters for a table name corresponding to that token type. Extracted string tokens may be stored 925, and a determination made as to whether there are additional tokens in the undelimited multi-token segment 930, such as may be indicated by a syntax record in the syntax database. If so, the Querier may return to 920 to extract the next token in the segment.

If the Querier determines at 901 that the next segment in the string is not an undelimited multi-token segment, then the Querier may extract the whole segment as a string token 905 and store the extracted string token 910, such as in a database, in random access memory, and/or the like.

A determination may be made as to whether there exists a delimiter past the token or tokens previously extracted 935. If there is an additional delimiter, the Querier may drop the delimiter from the string and move to evaluate the next string segment 940. In an implementation where there is no trailing delimiter at the end of a string in a table-tracking syntax, determining that there are no delimiters at 935 may cause the Querier to conclude parsing the input string and/or to provide extracted string tokens to a target 945, such as an end user, target application, database table and/or record, display device, report, and/or the like.

Figure 10:
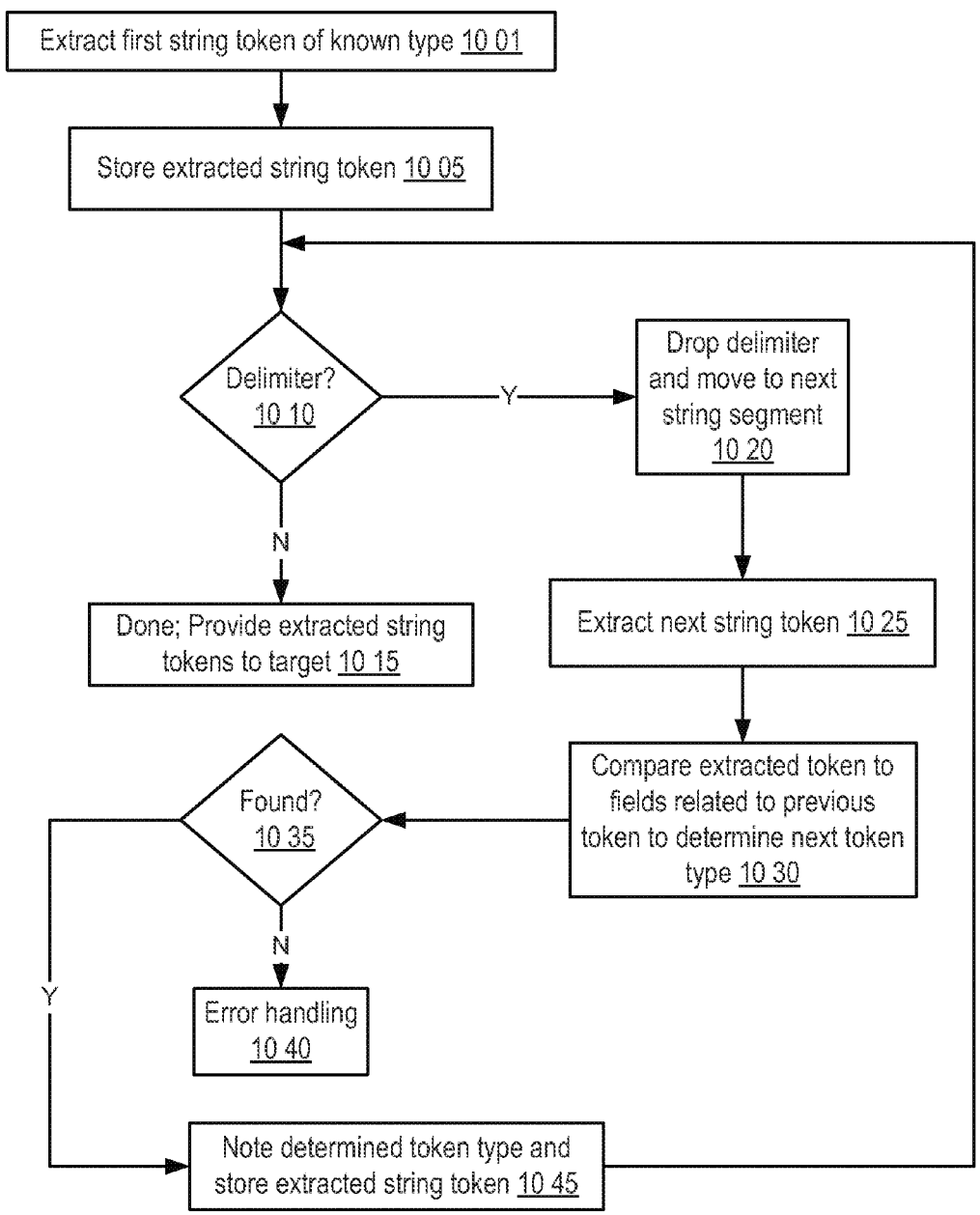
FIG. 10 shows an implementation of logic flow for parsing dynamic table-tracking syntax configured strings in one embodiment of Querier operation.

FIG. 10 shows an implementation of logic flow for parsing dynamic table-tracking syntax configured strings in one embodiment of Querier operation. A first string token of known type may be extracted 1001 and stored 1005. In one implementation, all dynamic table-tracking syntax configured strings may be configured with the same type of leading string token (e.g., an organization name). In another implementation, the token type of the leading string token may be discerned prior to parsing, such as via contextual indicia, such as how the string was submitted to the Querier, simultaneously running applications, other user inputs and/or instructions from other software modules, and/or the like.

A determination may then be made as to whether there exists a delimiter after the first extracted token 1010. If not, such as in the case of a single-token string configuration, then the Querier's parsing of the dynamic table-tracking syntax string may be concluded and/or the extracted string token provided to a target 1015. If a delimiter is found at 1010, the Querier may drop the delimiter from the input string and move to the next segment of the string 1020. The next string token may be extracted 1025 and compared with data fields and/or records of a table associated with the previously extracted token to determine a next token type 1030. A determination may be made as to whether a match to the token has been found 1035 and, if not, then an error handling procedure may be undertaken 1040, such as providing an error message to the user, requesting reentry of the input string, checking common typographical or spelling errors, and/or the like. If, on the other hand, a match is found to the next token, the determined token type may be noted and stored in association with the extracted token 1045, before returning to 1010 to check for a next delimiter in the string sequence.

In one embodiment, department codes may be parsed based on token positions relative to delimiting characters, and as such, provide the parsed values for use in SQL commands. For example, a rule may specify that all department codes having a particular token after the nth delimiting character are authorized to access a particular set of application files. A parsing routine may then count n delimiters and compare the immediately following token to the rule token to determine if the rule is applicable (e.g., whether a user associated with the department code is authorized to access the set of application files).

Figure 11:
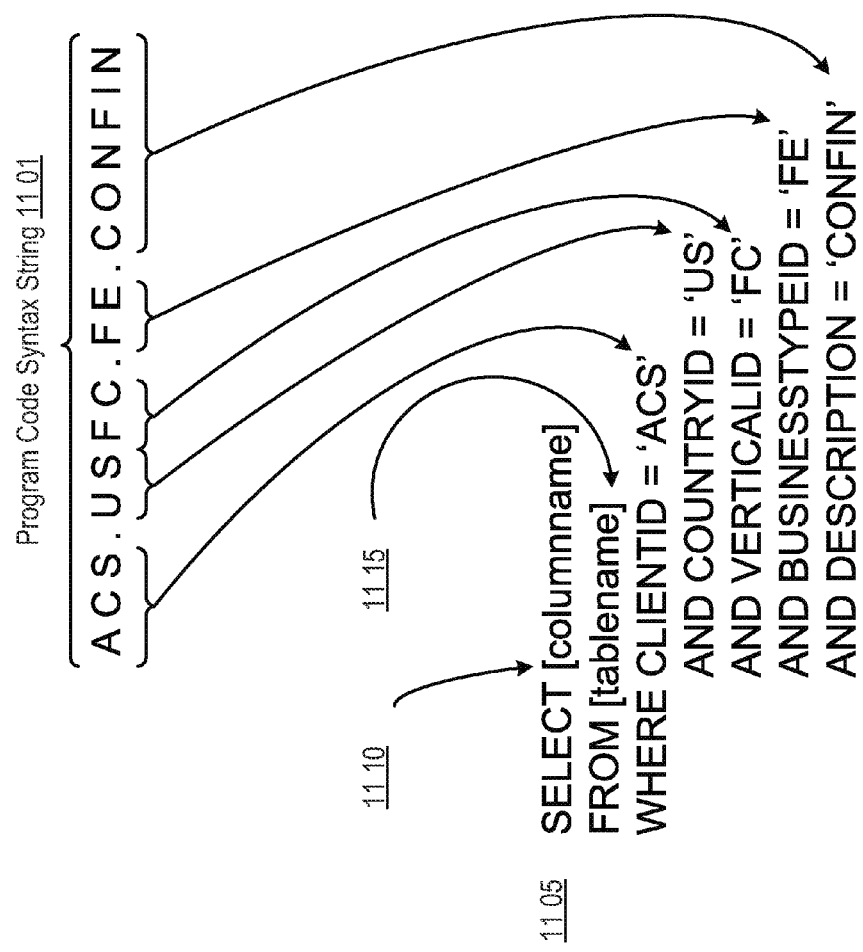
FIG. 11 provides a schematic illustration of an implementation of converting a table-tracking syntax configured string into a database query statement in one embodiment of Querier operation.

FIG. 11 provides a schematic illustration of an implementation of converting a table-tracking syntax configured string into a database query statement in one embodiment of Querier operation. The input string in the illustrated implementation 1101 is configured as a program code, having a first segment reflecting a client token, a second segment comprising an undelimited multi-token segment having a country token and a vertical token, a third segment reflecting a business type token, and a fourth segment reflecting a description token. The content of each token in a particular instance of a program code may be extracted and rearranged to form a SQL Select statement, such as that shown at 1105. In the illustrated implementation, the parsed string tokens are used to specify SQL Where search conditions, limiting the query to records having fields with matching values as those specified in the Where clauses. The Select statement 1105 also admits specification of a column name 1110 and table name 1115 from which the requested data should be selected. Thus, the Select statement at 1105 will select data from a column corresponding to "columnname" 1110 in a table corresponding to "tablename" 1115 for records in that table having a clientID="ACS", countryID="US", verticalID="FC", businesstypeID="FE", and description="CONFIN".

Figure 12:
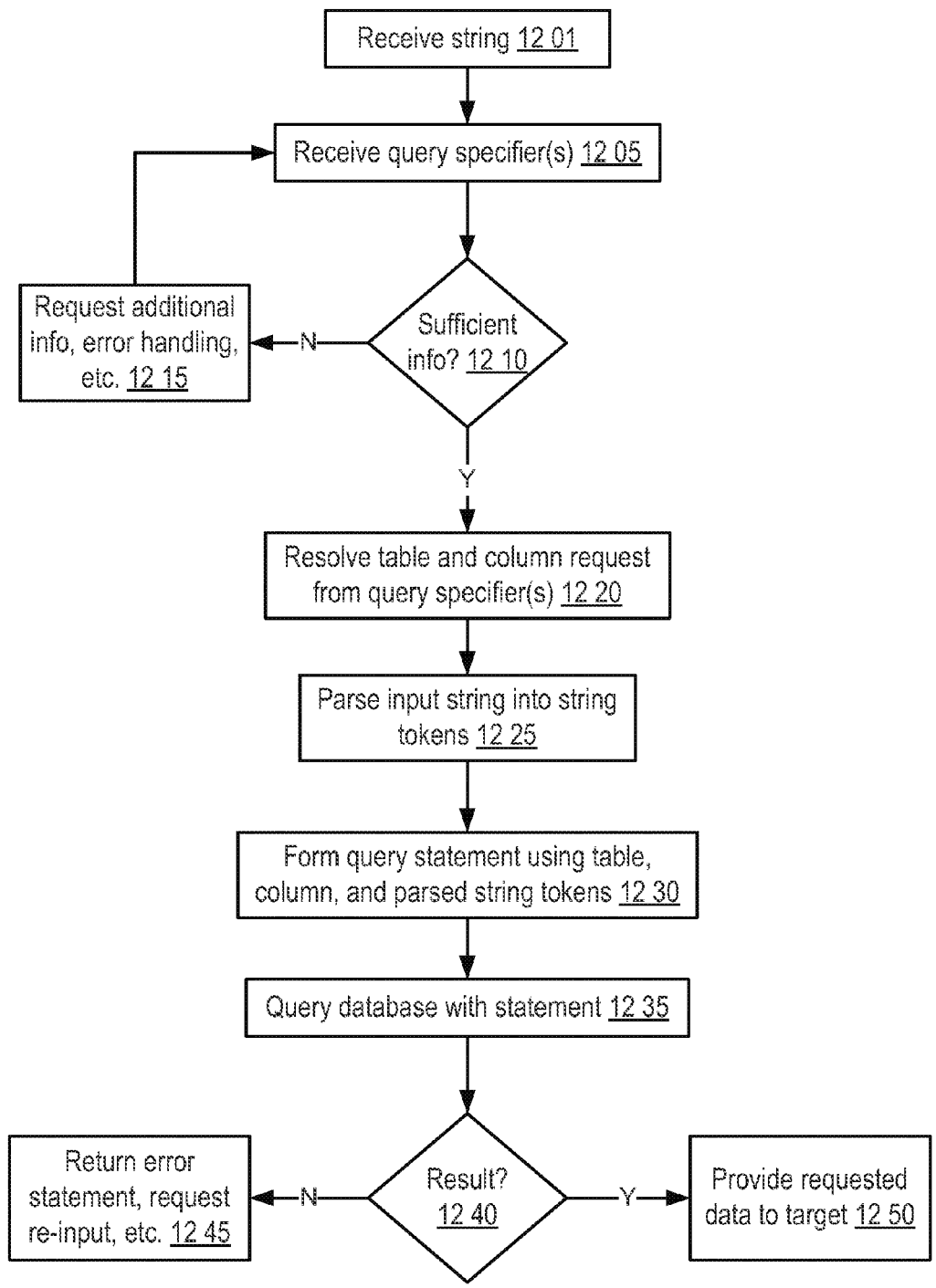
FIG. 12 shows an implementation of logic flow for forming a query statement based on an input string in one embodiment of Querier operation.

FIG. 12 shows an implementation of logic flow for forming a query statement based on an input string in one embodiment of Querier operation. A string is received at 1201, as well as any query specifiers 1205 which may comprise additional inputs that serve to provide further resolution and/or specificity related to a data request. For example, in one implementation, query specifiers 1205 may comprise information sufficient to identify at least one column name and/or table name in which requested data may be found. An example of a query specifier is a PLACEMENTMONTH of August 2008 submitted with a PROGRAMCODE of CL1.USMI.FP.HR and to retrieve associated matching data.

A determination may be made as to whether sufficient query specifiers have been supplied to conduct a database query 1210. If not, then an error handling procedure may be undertaken, an error message returned, additional information may be requested from a user, and/or the like 1215. If sufficient query specifiers have been supplied, the Querier may resolve a table name and/or a column name based on the query specifiers 1220. For example, in one implementation, the query specifiers themselves may comprise a table name and/or a column name. The Querier may also parse the input string into one or more string tokens 1225. The query statement may then be formed as a combination of parsed string tokens and resolved table name and/or column name 1230, and said statement used to query the database 1235. A determination may be made as to whether one or more results are returned in response to the query 1240. If not, then an error handling procedure may be undertaken, an error message returned, reentry of query parameters requested, and/or the like 1245. Otherwise, if a result is obtained by the query, the result may be provided to a target 1250, such as to the requesting system, to a third party user, application, system, and/or the like 1250.

Figure 13:
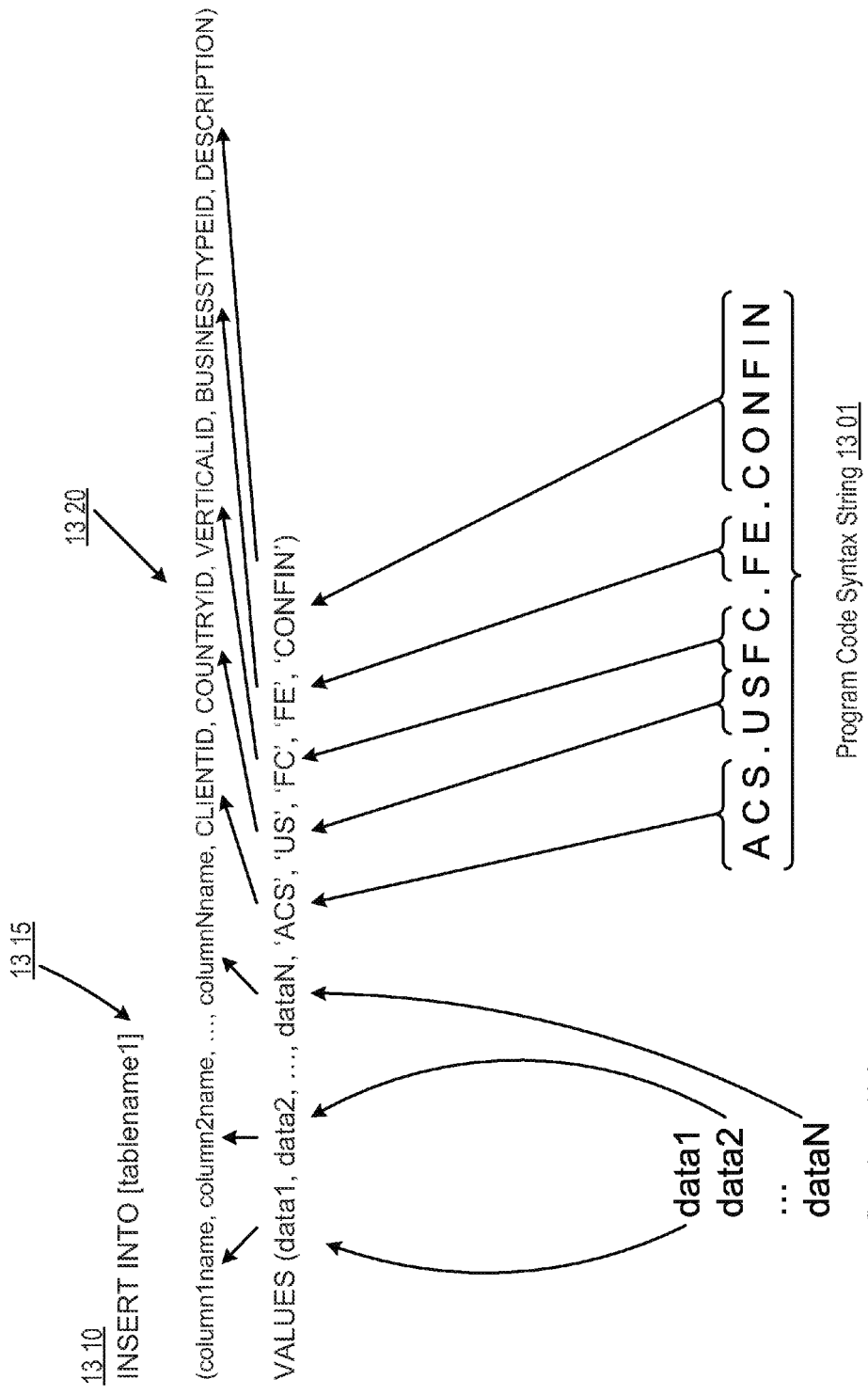
FIG. 13 provides a schematic illustration of an implementation of converting a table-tracking syntax configured string into a database input statement in one embodiment of Querier operation.

FIG. 13 provides a schematic illustration of an implementation of converting a table-tracking syntax configured string into a database input statement in one embodiment of Querier operation. In the illustrated implementation, a program code syntax configured string 1301 is provided to the Querier, along with a series of data inputs 1305. Tokens parsed from the input string, along with the data inputs, may be used to form a SQL Input statement such as that shown at 1310, where the data inputs and string tokens comprise values to populate fields in a database record. The illustrated Input statement may also include specification of one or more table names 1315, one or more column 1320, and/or the like, such as to identify a location in the database where the received data inputs should be entered. Therefore, in the illustrated implementation, data1 is slotted for input to column1name, data2 to column2name, and so forth, and "ACS" is slotted for input to the CLIENTID column, "US" to the COUNTRYID column, and so forth. The illustrated implementation is directed to circumstances where all of the input data is to be entered into a single table having accommodating fields. In some other implementations, the Querier may accommodate data inputs destined for different database tables, such as by discerning linking relationships between tables and generating appropriate JOIN statements for inclusion in a database transaction command statement such as that shown at 1301. In one implementation, a table name, column name, and/or the like to be included in the Input statement may be discernable based on a variety of different information sources, such as but not limited to a received string and/or parsed string tokens, a type and/or content of data inputs, a source of data inputs and/or input string (e.g., based on the identity of a submitting application), a user's data input permissions, and/or the like.

Figure 14:
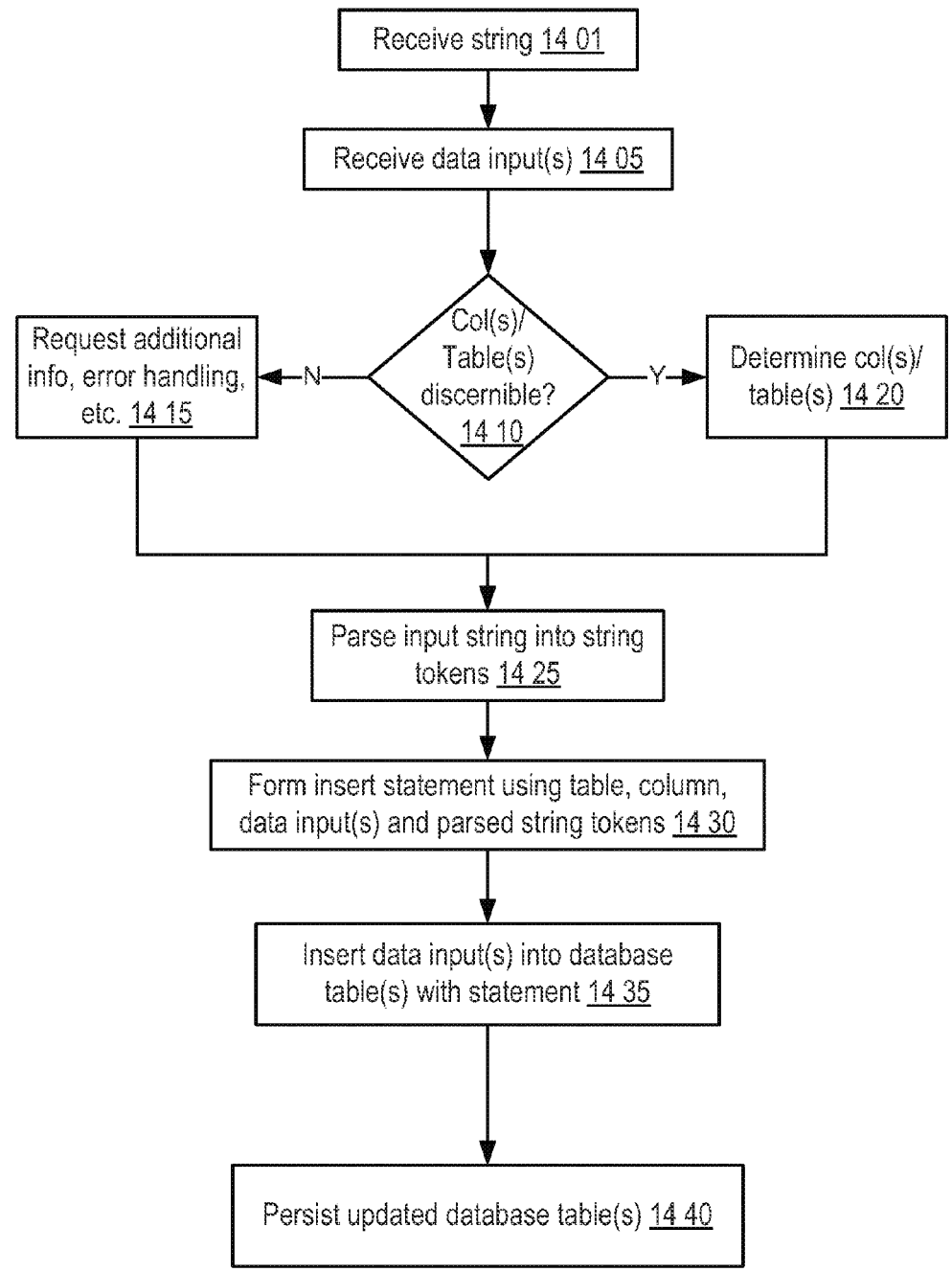
FIG. 14 shows an implementation of logic flow for forming a database input statement based on an input string in one embodiment of Querier operation.

FIG. 14 shows an implementation of logic flow for forming a database input statement based on an input string in one embodiment of Querier operation. An input string is received 1401, along with attendant data inputs 1405, which may represent data sought to be input to the database by a user, and may comprise data values, rules, reports, data collections, and/or the like inputs. A determination may be made as to whether a table name and/or column name are discernible 1410, such as based on the received string and/or data, a source of the received string and/or data (e.g., an application from which the string and data were received), a user profile and/or user permissions, and/or the like and/or any combination thereof. If a table name and/or column name are not discernible, the Querier may undertake an error handling procedure, request additional information from a user or requesting application, and/or the like 1415. Otherwise, the table name and/or column name may be determined from the provided information 1420. The Querier may then parse the input string into one or more string tokens 1425, and form an insert statement based on the parsed string tokens, the data inputs, and the table name and/or column name 1430. The data inputs may then be inserted into the database using the formed insert statement 1435, and the updated database tables may then be persisted 1440 for future use and/or reference.

QUERIER Controller

Figure 15:
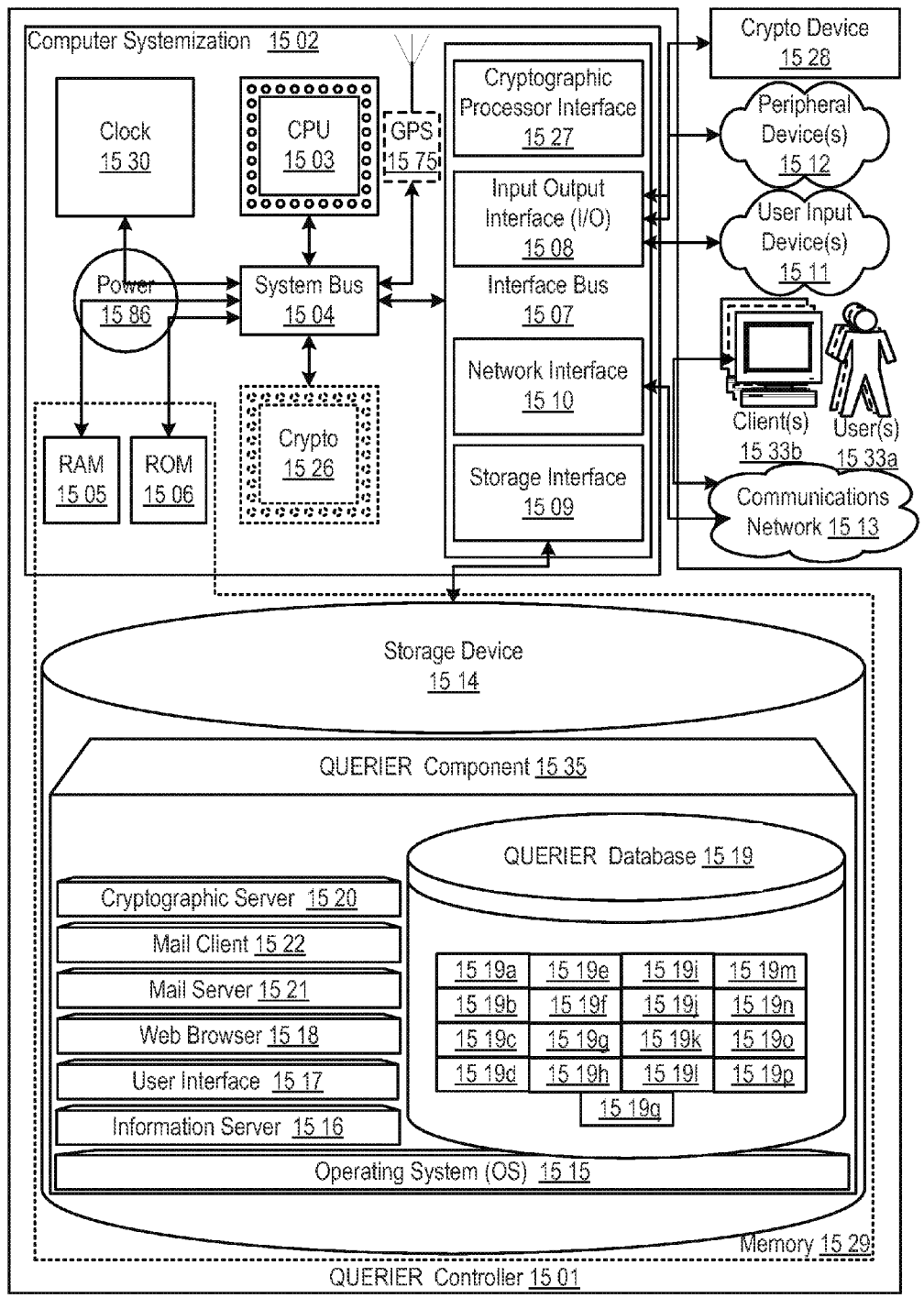
FIG. 15 is of a block diagram illustrating embodiments of the QUERIER controller.

FIG. 15 illustrates inventive aspects of a QUERIER controller 1501 in a block diagram. In this embodiment, the QUERIER controller 1501 may serve to aggregate, process, store, search, serve, identify, instruct, generate, match, and/or facilitate interactions with a computer through enterprise and human resource management technologies, and/or other related data.

Typically, users, which may be people and/or other systems, may engage information technology systems (e.g., computers) to facilitate information processing. In turn, computers employ processors to process information; such processors 1503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the QUERIER controller 1501 may be connected to and/or communicate with entities such as, but not limited to: one or more users from user input devices 1511; peripheral devices 1512; an optional cryptographic processor device 1528; and/or a communications network 1513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The QUERIER controller 1501 may be based on computer systems that may comprise, but are not limited to, components such as: a computer systemization 1502 connected to memory 1529.

Computer Systemization

A computer systemization 1502 may comprise a clock 1530, central processing unit ("CPU(s)" and/or "processor(s)" (these terms are used interchangeable throughout the disclosure unless noted to the contrary)) 1503, a memory 1529 (e.g., a read only memory (ROM) 1506, a random access memory (RAM) 1505, etc.), and/or an interface bus 1507, and most frequently, although not necessarily, are all interconnected and/or communicating through a system bus 1504 on one or more (mother)board(s) 1502 having conductive and/or otherwise transportive circuit pathways through which instructions (e.g., binary encoded signals) may travel to effect communications, operations, storage, etc. Optionally, the computer systemization may be connected to an internal power source 1586. Optionally, a cryptographic processor 1526 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the QUERIER controller and beyond through various interfaces. Should processing requirements dictate a greater amount speed and/or capacity, distributed processors (e.g., Distributed QUERIER), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the QUERIER may be achieved by implementing a microcontroller such as CAST's R8051XC2 microcontroller; Intel's MCS 51 (i.e., 8051 microcontroller); and/or the like. Also, to implement certain features of the QUERIER, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the QUERIER component collection (distributed or otherwise) and/or features may be implemented via the microprocessor and/or via embedded components; e.g., via ASIC, coprocessor, DSP, FPGA, and/or the like. Alternately, some implementations of the QUERIER may be implemented with embedded components that are configured and used to achieve a variety of features or signal processing.

Depending on the particular implementation, the embedded components may include software solutions, hardware solutions, and/or some combination of both hardware/software solutions. For example, QUERIER features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the QUERIER features. A hierarchy of programmable interconnects allow logic blocks to be interconnected as needed by the QUERIER system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the QUERIER may be developed on regular FPGAs and then migrated into a fixed version that more resembles ASIC implementations. Alternate or coordinating implementations may migrate QUERIER controller features to a final ASIC instead of or in addition to FPGAs. Depending on the implementation all of the aforementioned embedded components and microprocessors may be considered the "CPU" and/or "processor" for the QUERIER.

Power Source

The power source 1586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1586 is connected to at least one of the interconnected subsequent components of the QUERIER thereby providing an electric current to all subsequent components. In one example, the power source 1586 is connected to the system bus component 1504. In an alternative embodiment, an outside power source 1586 is provided through a connection across the I/O 1508 interface. For example, a USB and/or IEEE 1394 connection carries both data and power across the connection and is therefore a suitable source of power.

Interface Adapters

Interface bus(ses) 1507 may accept, connect, and/or communicate to a number of interface adapters, conventionally although not necessarily in the form of adapter cards, such as but not limited to: input output interfaces (I/O) 1508, storage interfaces 1509, network interfaces 1510, and/or the like. Optionally, cryptographic processor interfaces 1527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1509 may accept, communicate, and/or connect to a number of storage devices such as, but not limited to: storage devices 1514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1510 may accept, communicate, and/or connect to a communications network 1513. Through a communications network 1513, the QUERIER controller is accessible through remote clients 1533*b* (e.g., computers with web browsers) by users 1533*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed QUERIER), architectures may similarly be employed to pool, load balance, and/or otherwise increase the communicative bandwidth required by the QUERIER controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1510 may be used to engage with various communications network types 1513. For example, multiple network interfaces may be employed to allow for the communication over broadcast, multicast, and/or unicast networks.

Input Output interfaces (I/O) 1508 may accept, communicate, and/or connect to user input devices 1511, peripheral devices 1512, cryptographic processor devices 1528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1511 may be card readers, dongles, finger print readers, gloves, graphics tablets, joysticks, keyboards, mouse (mice), remote controls, retina readers, trackballs, trackpads, and/or the like.

Peripheral devices 1512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the QUERIER controller may be embodied as an embedded, dedicated, and/or monitor-less (i.e., headless) device, wherein access would be provided over a network interface connection.

Cryptographic units such as, but not limited to, microcontrollers, processors 1526, interfaces 1527, and/or devices 1528 may be attached, and/or communicate with the QUERIER controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1529. However, memory is a fungible technology and resource, thus, any number of memory embodiments may be employed in lieu of or in concert with one another. It is to be understood that the QUERIER controller and/or a computer systemization may employ various forms of memory 1529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1529 will include ROM 1506, RAM 1505, and a storage device 1514. A storage device 1514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1529 may contain a collection of program and/or database components and/or data such as, but not limited to: operating system component(s) 1515 (operating system); information server component(s) 1516 (information server); user interface component(s) 1517 (user interface); Web browser component(s) 1518 (Web browser); database(s) 1519; mail server component(s) 1521; mail client component(s) 1522; cryptographic server component(s) 1520 (cryptographic server); the QUERIER component(s) 1535; and/or the like (i.e., collectively a component collection). These components may be stored and accessed from the storage devices and/or from storage devices accessible through an interface bus. Although non-conventional program components such as those in the component collection, typically, are stored in a local storage device 1514, they may also be loaded and/or stored in memory such as: peripheral devices, RAM, remote storage facilities through a communications network, ROM, various forms of memory, and/or the like.

Operating System

The operating system component 1515 is an executable program component facilitating the operation of the QUERIER controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the QUERIER controller to communicate with other entities through a communications network 1513. Various communication protocols may be used by the QUERIER controller as a subcarrier transport mechanism for interaction, such as, but not limited to: multicast, TCP/IP, UDP, unicast, and/or the like.

Information Server

An information server component 1516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the QUERIER controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the QUERIER database 1519, operating systems, other program components, user interfaces, Web browsers, and/or the like.

Access to the QUERIER database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the QUERIER. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the QUERIER as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status.

Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the QUERIER enabled nodes. The combined application may be nugatory on systems employing standard Web browsers.

Mail Server

A mail server component 1521 is a stored program component that is executed by a CPU 1503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the QUERIER.

Access to the QUERIER mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1522 is a stored program component that is executed by a CPU 1503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1520 is a stored program component that is executed by a CPU 1503, cryptographic processor 1526, cryptographic processor interface 1527, cryptographic processor device 1528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the QUERIER may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the QUERIER component to engage in secure transactions if so desired. The cryptographic component facilitates the secure accessing of resources on the QUERIER and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The QUERIER Database

The QUERIER database component 1519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the QUERIER database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the QUERIER database is implemented as a data-structure, the use of the QUERIER database 1519 may be integrated into another component such as the QUERIER component 1535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1519 includes several tables 1519*a-q*. A ClientProgram table 1519*a* may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. A Sales table 1519*b* may include fields such as, but not limited to: SalesID, SalesName, SalesCode, StartDate, EndDate, CreatedBy, CreatedDate, UpdatedBy, UpdatedDate, TS, and/or the like. A ProgramType table 1519*c* may include fields such as, but not limited to: ProgramTypeID, ProgramTypeName, StartDate, EndDate, CreatedBy, CreatedDate, UpdatedBy, UpdatedDate, TS, and/or the like. A BusinessType table 1519*d* may include fields such as, but not limited to: BusinessTypeID, BusinessTypeCode, BusinessTypeName, StartDate, EndDate, CreatedBy, CreatedDate, UpdatedBy, UpdatedDate, TS, and/or the like. A ClientProgramHistory table 1519*e* may include fields such as, but not limited to: ProgramHistoryID, OldProgramCode, ChangeDate, EndDate, CreatedBy, CreatedDate, UpdatedBy, UpdatedDate, TS, ProgramID (FK), and/or the like. A Country table 1519*f* may include fields such as, but not limited to: CountryID, CountryName, CountryCode, StartDate, EndDate, CreatedBy, CreatedDate, UpdatedBy, UpdatedDate, TS, and/or the like. A LegalEntity table 1519*g* may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. A Client table 1519*h* may include fields such as, but not limited to: ClientID, ClientName, StartDate, EndDate, CreatedBy, CreatedDate, UpdatedBy, UpdatedDate, TS, CountryID (FK), VerticalID (FK) and/or the like. A Vertical table 1519*i* may include fields such as, but not limited to: VerticalID, VerticalName, VerticalCode, StartDate, EndDate, CreatedBy, CreatedDate, UpdatedBy, UpdatedDate, TS, and/or the like. A DepartmentCode table 1519*j* may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. A Department table 1519*k* may include fields such as, but not limited to: DepartmentID, Name, Code, Type, CreatedBy, CreatedDate, TS, and/or the like. A DepartmentHistory table 1519l may include fields such as, but not limited to: DepartmentHistoryID, DepartmentFullName, DepartmentCode, DepartmentID, ParentDepartmentID, ChangedDepartmentID, ChangedDate, StartDate, EndDate, CreatedBy, CreatedDate, UpdatedBy, UpdatedDate, TS, and/or the like. A Location table 1519*m* may include fields such as, but not limited to: LocationID, LocationName, LocationCode, StartDate, EndDate, CreatedBy, CreatedDate, UpdatedBy, UpdatedDate, TS, CountryID (FK), and/or the like. A Class table 1519*n* may include fields such as, but not limited to: ClassID, ClassName, ClassCode, StartDate, EndDate, CreatedBy, CreatedDate, UpdatedBy, UpdatedDate, TS, and/or the like. A SubClass table 1519*o* may include fields such as, but not limited to: SubClassID, SubClassName, SubClassCode, StartDate, End- Date, CreatedBy, CreatedDate, UpdatedBy, UpdatedDate, TS, ClassID (FK), SubClassTypeID (FK), and/or the like. An Assignment table 1519p may include fields such as, but not limited to: AssignmentID, StartDate, EndDate, CreatedBy, CreatedDate, UpdatedBy, UpdatedDate, TS, ProgramID (FK), DepartmentCodeID (FK), and/or the like. An Employee table 1519q may include fields such as, but not limited to: UserID, GUID, UserName, Email, SubTitleID, SubFunctionID, ISOwner, StartDate, EndDate, CreatedBy, CreatedDate, UpdatedBy, UpdatedDate, TS, TitleID (FK), FunctionID (FK), DepartmentCodeID, and/or the like. One or more of the tables discussed above may support and/or track multiple entity accounts on a QUERIER.

In one embodiment, the QUERIER database may interact with other database systems. For example, employing a distributed database system, queries and data access by search QUERIER component may treat the combination of the QUERIER database, an integrated data security layer database as a single database entity.

In one embodiment, user programs may contain various user interface primitives, which may serve to update the QUERIER. Also, various accounts may require custom database tables depending upon the environments and the types of clients the QUERIER may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1519a-q. The QUERIER may be configured to keep track of various settings, inputs, and parameters via database controllers.

The QUERIER database may communicate to and/or with other components in a component collection, including itself, and/or facilities of the like. Most frequently, the QUERIER database communicates with the QUERIER component, other program components, and/or the like. The database may contain, retain, and provide information regarding other nodes and data.

The QUERIERs

The QUERIER component 1535 is a stored program component that is executed by a CPU. In one embodiment, the QUERIER component incorporates any and/or all combinations of the aspects of the QUERIER that was discussed in the previous figures. As such, the QUERIER affects accessing, obtaining and the provision of information, services, transactions, and/or the like across various communications networks.

The QUERIER component enables the management of enterprise and human resources, the provision of tailored and/or personalized computing experiences, massively scalable monitoring and regulation of personnel, efficient collection, organization, distribution, and presentation of enterprise data, and/or the like and use of the QUERIER.

The QUERIER component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the QUERIER server employs a cryptographic server to encrypt and decrypt communications. The QUERIER component may communicate to and/or with other components in a component collection, including itself, and/or facilities of the like. Most frequently, the QUERIER component communicates with the QUERIER database, operating systems, other program components, and/or the like. The QUERIER may contain, communicate, generate, obtain, and/or provide program component, system, user, and/or data communications, requests, and/or responses.

Distributed QUERIERs

The structure and/or operation of any of the QUERIER node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the QUERIER controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

1. A database interfacing processor-implemented method, comprising:
receiving an input string having a syntax grammar format wherein each syntax token correlates to one of a plurality of inter-linked table objects in a database;
parsing the input string for each syntax token;
generating a database command from a composite of the parsed syntax tokens; and
transacting command-specified data with the database using the database command.

2. The method of claim 1, further comprising:
generating the plurality of inter-linked table objects in the database.

3. The method of claim 1, wherein the database command comprises a database selection command, and wherein transacting further comprises:
querying the database system with the selection command; and
retrieving command-specified data based on the querying.

4. The method of claim 3, further comprising:
providing the command-specific data to at least one target.

5. The method of claim 4, wherein the at least one target comprises a receiving application.

6. The method of claim 4, wherein the input string is received from the target.

7. The method of claim 3, wherein the database selection command comprises a structured query language select command.

8. The method of claim 1, wherein the database command comprises a database insertion command, and further comprising:

receiving insertable data values in association with the input string;
wherein transacting further comprises:
submitting the insertion command including the insertable data values to the database system to store the data values in tables of the database system.

9. The method of claim 8, wherein the database insertion command comprises a structured query language insert command.

10. The method of claim 1, wherein the syntax grammar format comprises a string of delimited syntax tokens, wherein each syntax token corresponds to a table identifier for each of the plurality of inter-linked table objects.

11. The method of claim 10, wherein parsing the input string for each syntax token further comprises parsing table identifiers corresponding to syntax tokens in the input string based on delimiters in the input string.

12. The method of claim 1, wherein syntax tokens of the input string include:
a client identifier;
a country identifier;
a vertical market identifier;
a business type identifier; and
a description.

13. The method of claim 1, wherein syntax tokens are selected from the group consisting of:
a function;
a sub-function;
a country identifier;
a location identifier;
a vertical market identifier;
a business type identifier;
a client name; and
a team name.

14. The method of claim 1, wherein the input string is generated in response to selection of string tokens in a graphical user interface.

15. The method of claim 14, wherein the string tokens are placed in a hierarchical arrangement in the graphical user interface, and the string token is configured in accordance with the hierarchical arrangement.

16. A database interfacing-processor-implemented method, comprising:
generating a plurality of inter-linked table objects in a database;
receiving an input string having a syntax grammar format wherein each syntax token correlates to one of the plurality of inter-linked table objects;
parsing the input string for each syntax token;
generating a database selection command from a composite of the parsed syntax tokens;
querying the database with the selection command;
retrieving grammar responsive data based on the querying; and
providing the grammar responsive data to at least one receiving application.

17. The method of claim 16, wherein the input string is received from the at least one receiving application.

18. The method of claim 16, wherein the syntax grammar format comprises a string of delimited syntax tokens, wherein each syntax token corresponds to a table identifier for each of the plurality of inter-linked table objects.

19. The method of claim 18, wherein parsing the input string for each syntax token further comprises parsing table identifiers corresponding to syntax tokens in the input string based on delimiters in the input string.

20. A database interfacing-processor implemented method, comprising:
generating an input string having a syntax grammar format wherein each syntax token correlates to one of a plurality of inter-linked table objects in a database;
providing the input string to a database management system associated with the database; and
transacting data with the database based on the provided input string.

21. The method of claim 20, wherein transacting further comprises:
receiving the data stored in the database from the database management system.

22. The method of claim 20, wherein transacting further comprises:
instructing provision of the data stored in the database to a third party system.

23. The method of claim 20, further comprising:
providing a database command instruction to the database management system in association with the input string.

24. The method of claim 23, wherein the database command instruction comprises a database query instruction.

25. The method of claim 23, wherein the database command instruction comprises a database insertion instruction, and wherein transacting further comprises:
providing at least one data value to the database management system in association with the input string for storage in the database.

26. A database interfacing apparatus, comprising:
a memory;
a processor disposed in communication with said memory and configured to issue a plurality of processing instructions stored in the memory, wherein the processor issues instructions to:
receive an input string having a syntax grammar format wherein each syntax token correlates to one of a plurality of inter-linked table objects in a database;
parse the input string for each syntax token;
generate a database command from a composite of the parsed syntax tokens; and
transact command-specified data with the database using the database command.

27. The apparatus of claim 26, further comprising:
generate the plurality of inter-linked table objects in the database.

28. The apparatus of claim 26, wherein the database command comprises a database selection command, and wherein transact further comprises:
query the database system with the selection command; and
retrieve command-specified data based on the querying.

29. The apparatus of claim 28, further comprising:
provide the command-specific data to at least one target.

30. The apparatus of claim 29, wherein the at least one target comprises a receiving application.

31. The apparatus of claim 29, wherein the input string is received from the target.

32. The apparatus of claim 28, wherein the database selection command comprises a structured query language select command.

33. The apparatus of claim 26, wherein the database command comprises a database insertion command, and further comprising:
receive insertable data values in association with the input string;
wherein transact further comprises:
submit the insertion command including the insertable data values to the database system to store the data values in tables of the database system.

34. The apparatus of claim 33, wherein the database insertion command comprises a structured query language insert command.

35. The apparatus of claim 26, wherein the syntax grammar format comprises a string of delimited syntax tokens, wherein each syntax token corresponds to a table identifier for each of the plurality of inter-linked table objects.

36. The apparatus of claim 35, wherein parse the input string for each syntax token further comprises parse table identifiers corresponding to syntax tokens in the input string based on delimiters in the input string.

37. The apparatus of claim 26, wherein syntax tokens of the input string include:
a client identifier;
a country identifier;
a vertical market identifier;
a business type identifier; and
a description.

38. The apparatus of claim 26, wherein syntax tokens are selected from the group consisting of:
a function;
a sub-function;
a country identifier;
a location identifier;
a vertical market identifier;
a business type identifier;
a client name; and
a team name.

39. The apparatus of claim 26, wherein the input string is generated in response to selection of string tokens in a graphical user interface.

40. The apparatus of claim 39, wherein the string tokens are placed in a hierarchical arrangement in the graphical user interface, and the string token is configured in accordance with the hierarchical arrangement.

41. A database interfacing apparatus, comprising:
a memory;
a processor disposed in communication with said memory, and configured to issue a plurality of processing instructions stored in the memory, wherein the processor issues instructions to:
generate a plurality of inter-linked table objects in a database;
receive an input string having a syntax grammar format wherein each syntax token correlates to one of the plurality of inter-linked table objects;
parse the input string for each syntax token;
generate a database selection command from a composite of the parsed syntax tokens;
query the database with the selection command;
retrieve grammar responsive data based on the querying; and
provide the grammar responsive data to at least one receiving application.

42. The apparatus of claim 41, wherein the input string is received from the at least one receiving application.

43. The apparatus of claim 41, wherein the syntax grammar format comprises a string of delimited syntax tokens, wherein each syntax token corresponds to a table identifier for each of the plurality of inter-linked table objects.

44. The apparatus of claim 43, wherein parse the input string for each syntax token further comprises parse table identifiers corresponding to syntax tokens in the input string based on delimiters in the input string.

45. A database interfacing apparatus, comprising:
a memory;
a processor disposed in communication with said memory, and configured to issue a plurality of processing instructions stored in the memory, wherein the processor issues instructions to:
generate an input string having a syntax grammar format wherein each syntax token correlates to one of a plurality of inter-linked table objects in a database;
provide the input string to a database management system associated with the database; and
transact data with the database based on the provided input string.

46. The apparatus of claim 45, wherein transact further comprises:
receive the data stored in the database from the database management system.

47. The apparatus of claim 45, wherein transact further comprises:
instruct provision of the data stored in the database to a third party system.

48. The apparatus of claim 45, further comprising:
provide a database command instruction to the database management system in association with the input string.

49. The apparatus of claim 48, wherein the database command instruction comprises a database query instruction.

50. The apparatus of claim 48, wherein the database command instruction comprises a database insertion instruction, and wherein transact further comprises:
provide at least one data value to the database management system in association with the input string for storage in the database.

51. A database interfacing processor-accessible medium, comprising:
a plurality of processing instructions stored in the medium and issuable by a processor to:
receive an input string having a syntax grammar format wherein each syntax token correlates to one of a plurality of inter-linked table objects in a database;
parse the input string for each syntax token;
generate a database command from a composite of the parsed syntax tokens; and
transact command-specified data with the database using the database command.

52. The medium of claim 51, further comprising:
generate the plurality of inter-linked table objects in the database.

53. The medium of claim 51, wherein the database command comprises a database selection command, and wherein transact further comprises:
query the database system with the selection command; and
retrieve command-specified data based on the querying.

54. The medium of claim 53, further comprising:
provide the command-specific data to at least one target.

55. The medium of claim 54, wherein the at least one target comprises a receiving application.

56. The medium of claim 54, wherein the input string is received from the target.

57. The medium of claim 53, wherein the database selection command comprises a structured query language select command.

58. The medium of claim 51, wherein the database command comprises a database insertion command, and further comprising:

receive insertable data values in association with the input string;
wherein transact further comprises:
submit the insertion command including the insertable data values to the database system to store the data values in tables of the database system.

59. The medium of claim 58, wherein the database insertion command comprises a structured query language insert command.

60. The medium of claim 51, wherein the syntax grammar format comprises a string of delimited syntax tokens, wherein each syntax token corresponds to a table identifier for each of the plurality of inter-linked table objects.

61. The medium of claim 51, wherein parse the input string for each syntax token further comprises parse table identifiers corresponding to syntax tokens in the input string based on delimiters in the input string.

62. The medium of claim 61, wherein syntax tokens of the input string include:
a client identifier;
a country identifier;
a vertical market identifier;
a business type identifier; and
a description.

63. The medium of claim 61, wherein syntax tokens are selected from the group consisting of:
a function;
a sub-function;
a country identifier;
a location identifier;
a vertical market identifier;
a business type identifier;
a client name; and
a team name.

64. The medium of claim 61, wherein the input string is generated in response to selection of string tokens in a graphical user interface.

65. The medium of claim 64, wherein the string tokens are placed in a hierarchical arrangement in the graphical user interface, and the string token is configured in accordance with the hierarchical arrangement.

66. A database interfacing processor-accessible medium, comprising:
a plurality of processing instructions stored in the medium and issuable by a processor to:
generate a plurality of inter-linked table objects in a database;
receive an input string having a syntax grammar format wherein each syntax token correlates to one of the plurality of inter-linked table objects;
parse the input string for each syntax token;
generate a database selection command from a composite of the parsed syntax tokens;
query the database with the selection command;
retrieve grammar responsive data based on the querying; and
provide the grammar responsive data to at least one receiving application.

67. The medium of claim 66, wherein the input string is received from the at least one receiving application.

68. The medium of claim 66, wherein the syntax grammar format comprises a string of delimited syntax tokens, wherein each syntax token corresponds to a table identifier for each of the plurality of inter-linked table objects.

69. The medium of claim 68, wherein parse the input string for each syntax token further comprises parse table identifiers corresponding to syntax tokens in the input string based on delimiters in the input string.

70. A database interfacing processor-accessible medium, comprising:
a plurality of processing instructions stored in the medium and issuable by a processor to:
generate an input string having a syntax grammar format wherein each syntax token correlates to one of a plurality of inter-linked table objects in a database;
provide the input string to a database management system associated with the database; and
transact data with the database based on the provided input string.

71. The medium of claim 70, wherein transact further comprises:
receive the data stored in the database from the database management system.

72. The medium of claim 70, wherein transact further comprises:
instruct provision of the data stored in the database to a third party system.

73. The medium of claim 70, further comprising:
provide a database command instruction to the database management system in association with the input string.

74. The medium of claim 73, wherein the database command instruction comprises a database query instruction.

75. The medium of claim 73, wherein the database command instruction comprises a database insertion instruction, and wherein transact further comprises:
provide at least one data value to the database management system in association with the input string for storage in the database.

76. A database interfacing system, comprising:
means to receive an input string having a syntax grammar format wherein each syntax token correlates to one of a plurality of inter-linked table objects in a database;
means to parse the input string for each syntax token;
means to generate a database command from a composite of the parsed syntax tokens; and
means to transact command-specified data with the database using the database command.

77. The system of claim 76, further comprising:
means to generate the plurality of inter-linked table objects in the database.

78. The system of claim 76, wherein the database command comprises a database selection command, and wherein means to transact further comprises:
means to query the database system with the selection command; and
means to retrieve command-specified data based on the querying.

79. The system of claim 78, further comprising:
means to provide the command-specific data to at least one target.

80. The system of claim 79, wherein the at least one target comprises a receiving application.

81. The system of claim 79, wherein the input string is received from the target.

82. The system of claim 78, wherein the database selection command comprises a structured query language select command.

83. The system of claim 76, wherein the database command comprises a database insertion command, and further comprising:

means to receive insertable data values in association with the input string;
wherein means to transact further comprises:
means to submit the insertion command including the insertable data values to the database system to store the data values in tables of the database system.

84. The system of claim 83, wherein the database insertion command comprises a structured query language insert command.

85. The system of claim 76, wherein the syntax grammar format comprises a string of delimited syntax tokens, wherein each syntax token corresponds to a table identifier for each of the plurality of inter-linked table objects.

86. The system of claim 85, wherein means to parse the input string for each syntax token further comprises means to parse table identifiers corresponding to syntax tokens in the input string based on delimiters in the input string.

87. The system of claim 76, wherein syntax tokens of the input string include:
a client identifier;
a country identifier;
a vertical market identifier;
a business type identifier; and
a description.

88. The system of claim 76, wherein syntax tokens are selected from the group consisting of:
a function;
a sub-function;
a country identifier;
a location identifier;
a vertical market identifier;
a business type identifier;
a client name; and
a team name.

89. The system of claim 76, wherein the input string is generated in response to selection of string tokens in a graphical user interface.

90. The system of claim 89, wherein the string tokens are placed in a hierarchical arrangement in the graphical user interface, and the string token is configured in accordance with the hierarchical arrangement.

91. A database interfacing system, comprising:
means to generate a plurality of inter-linked table objects in a database;
means to receive an input string having a syntax grammar format wherein each syntax token correlates to one of the plurality of inter-linked table objects;
means to parse the input string for each syntax token;
means to generate a database selection command from a composite of the parsed syntax tokens;
means to query the database with the selection command;
means to retrieve grammar responsive data based on the querying; and
means to provide the grammar responsive data to at least one receiving application.

92. The system of claim 91, wherein the input string is received from the at least one receiving application.

93. The system of claim 91, wherein the syntax grammar format comprises a string of delimited syntax tokens, wherein each syntax token corresponds to a table identifier for each of the plurality of inter-linked table objects.

94. The system of claim 93, wherein means to parse the input string for each syntax token further comprises means to parse table identifiers corresponding to syntax tokens in the input string based on delimiters in the input string.

95. A database interfacing system, comprising:
  means to generate an input string having a syntax grammar format wherein each syntax token correlates to one of a plurality of inter-linked table objects in a database;
  means to provide the input string to a database management system associated with the database; and
  means to transact data with the database based on the provided input string.

96. The medium of claim 95, wherein transact further comprises:
  receive the data stored in the database from the database management system.

97. The medium of claim 95, wherein means to transact further comprises:
  means to instruct provision of the data stored in the database to a third party system.

98. The medium of claim 95, further comprising:
  means to provide a database command instruction to the database management system in association with the input string.

99. The medium of claim 98, wherein the database command instruction comprises a database query instruction.

100. The medium of claim 98, wherein the database command instruction comprises a database insertion instruction, and wherein means to transact further comprises:
  means to provide at least one data value to the database management system in association with the input string for storage in the database.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A database interfacing processor-implemented method, comprising:
  receiving an input string having a plurality of syntax tokens arranged in accordance with a syntax grammar format and following business grammar rules for the arrangement of a plurality of data and application identifying items in at least one database, wherein each of said plurality of syntax tokens in the input string relates to at least one of a plurality of inter-linked table objects in a database, each inter-linked table object containing a table object identifier and an additional business grammar information related to said table object, wherein said plurality of inter-linked table objects are interconnected based on the business grammar rules for the plurality of data and application identifying items in at least one database;
  determining whether a dynamic or static string token parsing of the input string should be utilized;
  determining syntax grammar format based on the context in which the input string was received and whether the dynamic or static token parsing is required;
  parsing the input string for each syntax token based on the syntax grammar;
  generating a database command from a composite of the parsed syntax tokens; and
  transacting command-specified data retrieval from the database using the database command.

2. The method of claim 1, further comprising:
  generating the plurality of inter-linked table objects in the database.

3. The method of claim 1, wherein the database command comprises a database selection command, and wherein transacting further comprises:
  querying the database system with the selection command; and
  retrieving command-specified data based on the querying.

4. The method of claim 3, further comprising: providing the command-specific data to at least one target.

5. The method of claim 4, wherein the at least one target comprises a receiving application.

6. The method of claim 4, wherein the input string is received from the target.

7. The method of claim 3, wherein the database selection command comprises a structured query language select command.

8. The method of claim 1, wherein the database command comprises a database insertion command, and further comprising:
  receiving insertable data values in association with the input string;

wherein transacting further comprises:
submitting the insertion command including the insertable data values to the database system to store the data values in tables of the database system.

9. The method of claim 8, wherein the database insertion command comprises a structured query language insert command.

10. The method of claim 1, wherein the syntax grammar format comprises a string of delimited syntax tokens, and wherein each syntax token of the input string corresponds to a table identifier for at least one of the plurality of inter-linked table objects, wherein a plurality of said inter-linked table objects are interconnected based on the hierarchically-structured business grammar arrangement for the plurality of data and application identifying items in at least one database.

11. The method of claim 10, wherein parsing the input string for each syntax token further comprises parsing table identifiers corresponding to syntax tokens in the input string based on delimiters in the input string.

12. The method of claim 1, wherein syntax tokens of the input string include:
a client identifier;
a country identifier;
a vertical market identifier;
a business type identifier; and
a description.

13. The method of claim 1, wherein syntax tokens are selected from the group consisting of:
a function;
a sub-function;
a country identifier;
a location identifier;
a vertical market identifier;
a business type identifier;
a client name; and
a team name.

14. The method of claim 1, wherein the input string is generated in response to selection of string tokens in a graphical user interface.

15. The method of claim 14, wherein the string tokens are placed in a hierarchical arrangement in the graphical user interface, and the string token is configured in accordance with the hierarchical arrangement.

16. A database interfacing-processor-implemented method, comprising:
generating a plurality of inter-linked table objects in a database, wherein each inter-linked table object contains a table object identifier and an additional business grammar information related to the table object, wherein said inter-linked table objects are interconnected based on business grammar rules for the plurality of data and application identifying items in at least one database;
receiving an input string having a plurality of syntax tokens arranged in accordance with a syntax grammar format and following business grammar rules for the arrangement of a plurality of data and application identifying items in at least one database, wherein each of said plurality of syntax tokens in the input string relates to at least one of a plurality of inter-linked table objects in a database, each inter-linked table object containing a table object identifier and an additional business grammar information related to said table object;
determining whether a dynamic or static string token parsing of the input string should be utilized;
determining syntax grammar format based on the context in which the input string was received and whether the dynamic or static token parsing is required;
parsing the input string for each syntax token based on the syntax grammar;
generating a database selection command from a composite of the parsed syntax tokens and business grammar information;
querying the database with the selection command;
retrieving grammar responsive data based on the querying; and
providing the grammar responsive data to at least one receiving application.

17. The method of claim 16, wherein the input string is received from the at least one receiving application.

18. The method of claim 16, wherein the syntax grammar format comprises a string of delimited syntax tokens, and wherein each syntax token corresponds to a table identifier for at least one each of the plurality of inter-linked table objects.

19. The method of claim 18, wherein parsing the input string for each syntax token further comprises parsing table identifiers corresponding to syntax tokens in the input string based on delimiters in the input string.

20. A database interfacing-processor implemented method, comprising:
generating an input string having a plurality of syntax tokens arranged in accordance with a syntax grammar format and following business grammar rules for the arrangement of a plurality of data and application identifying items in at least one database, wherein each of said plurality of syntax tokens in the input string relates to at least one of a plurality of inter-linked table objects in a database, each inter-linked table object containing a table object identifier and an additional business grammar information related to said table object, wherein said inter-linked table objects are interconnected based on the business grammar rules for the plurality of data and application identifying items in the at least one database;
determining whether a dynamic or static string token parsing of the input string should be utilized;
determining syntax grammar format based on the context in which the input string was received and whether the dynamic or static token parsing is required;
parsing the input string for each syntax token based on the syntax grammar;
providing the data and application identifying items to a database management system associated with at least one the database; and
transacting data with the database based on the provided data and application identifying items.

21. The method of claim 20, wherein transacting further comprises:
receiving the data stored in the database from the database management system.

22. The method of claim 20, wherein transacting further comprises:
instructing provision of the data stored in the database to a third party system.

23. The method of claim 20, further comprising:
providing a database command instruction to the database management system in association with the input string.

24. The method of claim 23, wherein the database command instruction comprises a database query instruction.

25. The method of claim 23, wherein the database command instruction comprises a database insertion instruction, and wherein transacting further comprises:
providing at least one data value to the database management system in association with the input string for storage in the database.

26. A database interfacing apparatus, comprising:
a memory;
a hardware processor disposed in communication with said memory and configured to issue a plurality of processing instructions stored in the memory, wherein the processor issues instructions to:
receive an input string having a plurality of syntax tokens arranged in accordance with a syntax grammar format and following business grammar rules for the arrangement of a plurality of data and application identifying items in at least one database, wherein each of said plurality of syntax tokens in the input string relates to at least one of a plurality of inter-linked table objects in a database, each inter-linked table object containing a table object identifier and an additional business grammar information related to said table object;
generate a plurality of inter-linked table objects in a database, wherein each inter-linked table object contains a table object identifier and an additional business grammar information related to the table object, wherein said inter-linked table objects are interconnected based on the business grammar rules for the plurality of data and application identifying items in the at least one database;
generate a database command from a composite of the parsed syntax tokens from the input string; and
transact command-specified data with the at least one database using the database access command.

27. A database interfacing apparatus, comprising:
a memory;
a hardware processor disposed in communication with said memory, and configured to issue a plurality of processing instructions stored in the memory, wherein the processor issues instructions to:
generate a plurality of inter-linked table objects in a database, wherein each inter-linked table object contains a table object identifier and an additional business grammar information related to the table object, wherein said inter-linked table objects are interconnected based on business grammar rules for the plurality of data and application identifying items in at least one database;
receive an input string having a plurality of syntax tokens arranged in accordance with a syntax grammar format and following business grammar rules for the arrangement of a plurality of data and application identifying items in at least one database, wherein each of said plurality of syntax tokens in the input string relates to at least one of a plurality of inter-linked table objects in a database, each said inter-linked table object containing a table object identifier and an additional business grammar information related to said table object;
determine whether a dynamic or static string token parsing of the input string should be utilized;
determine syntax grammar format based on the context in which the input string was received and whether the dynamic or static token parsing is required;
parse the input string for each syntax token based on the syntax grammar;
generate a database selection command from a composite of the parsed syntax tokens;
query the database with the selection command;
retrieve grammar responsive data based on the querying; and
provide the grammar responsive data to at least one receiving application.

28. A database interfacing apparatus, comprising:
a memory;
a hardware processor disposed in communication with said memory, and configured to issue a plurality of processing instructions stored in the memory, wherein the processor issues instructions to:
generate an input string having a plurality of syntax tokens arranged in accordance with a syntax grammar format and following business grammar rules for the arrangement of a plurality of data and application identifying items in at least one database, wherein each of said plurality of syntax tokens in the input string relates to at least one of a plurality of inter-linked table objects in a database, each inter-linked table object containing a table object identifier and an additional business grammar information related to said table object;
provide the data and application identifying items to a database management system associated with at least one database; and
transact data with the database based on the provided data and application identifying items.

29. A database access system having a processor-readable medium, comprising:
a hardware processor accessing the processor-readable medium;
a plurality of processing instructions stored in the medium and issuable by a processor to:
receive an input string having a plurality of syntax tokens arranged in accordance with a syntax grammar format and following business grammar rules for the arrangement of a plurality of data and application identifying items in at least one database, wherein each of said plurality of syntax tokens in the input string relates to at least one of a plurality of inter-linked table objects in a database, each inter-linked table object containing a table object identifier and an additional business grammar information related to said table object;
determine whether a dynamic or static string token parsing of the input string should be utilized;
determine syntax grammar format based on the context in which the input string was received and whether the dynamic or static token parsing is required;
parse the input string for each syntax token based on the syntax grammar;
generate a database command from a composite of the parsed syntax tokens; and
transact command-specified data with the database using the database command.

30. A database access system having a processor-readable medium, comprising:
a hardware processor accessing the processor-readable medium;
a plurality of processing instructions stored in the medium and issuable by a processor to:
generate a plurality of inter-linked table objects in a database, wherein each inter-linked table object contains a table object identifier and an additional business grammar information related to the table object, wherein said inter-linked table objects are interconnected based on the business grammar rules for the plurality of data and application identifying items in at least one database;
receive an input string having a plurality of syntax tokens arranged in accordance with a syntax grammar format and following business grammar rules for the arrangement of a plurality of data and application identifying items in at least one database, wherein each of said plurality of syntax tokens in the input string relates to at least one of a plurality of inter-linked table objects in a database, each said inter-linked table object containing a table object identifier and an additional business grammar information related to said table object;

determine whether a dynamic or static string token parsing of the input string should be utilized;

determine syntax grammar format based on the context in which the input string was received and whether the dynamic or static token parsing is required;

parse the input string for each syntax token based on the syntax grammar;

generate a database selection command from a composite of the parsed syntax tokens;

query the database with the selection command;

retrieve grammar responsive data based on the querying; and provide the grammar responsive data to at least one receiving application.

31. A database interfacing system, comprising:

means to receive an input string having a plurality of syntax tokens arranged in accordance with a syntax grammar format and following business grammar rules for the arrangement of a plurality of data and application identifying items in at least one database, wherein each of said plurality of syntax tokens in the input string relates to at least one of a plurality of inter-linked table objects in a database, each inter-linked table object containing a table object identifier and an additional business grammar information related to said table object;

means to determine whether a dynamic or static string token parsing of the input string should be utilized;

means to determine syntax grammar format based on the context in which the input string was received and whether the dynamic or static token parsing is required;

means to parse the input string for each syntax token based on the syntax grammar;

means to generate a database command from a composite of the parsed syntax tokens; and means to transact command-specified data with the database using the database command.

32. A database interfacing system, comprising:

means to generate a plurality of inter-linked table objects in a database, wherein each said inter-linked table object contains a table object identifier and an additional business grammar information related to the table object, wherein said inter-linked table objects are interconnected based on the business grammar rules for the plurality of data and application identifying items in at least one database;

means to receive an input string having a plurality of syntax tokens arranged in accordance with a syntax grammar format and following business grammar rules for the arrangement of a plurality of data and application identifying items in at least one database, wherein each of said plurality of syntax tokens in the input string relates to at least one of a plurality of inter-linked table objects in a database, each inter-linked table object containing a table object identifier and an additional business grammar information related to said table object;

means to determine whether a dynamic or static string token parsing of the input string should be utilized;

means to determine syntax grammar format based on the context in which the input string was received and whether the dynamic or static token parsing is required;

means to parse the input string for each syntax token based on the syntax grammar;

means to generate a database selection command from a composite of the parsed syntax tokens;

means to query the database with the selection command;

means to retrieve grammar responsive data based on the querying; and means to provide the grammar responsive data to at least one receiving application.

* * * * *